(12) United States Patent
Pontecorvo

(10) Patent No.: US 11,181,227 B1
(45) Date of Patent: Nov. 23, 2021

(54) ELECTRONIC DEVICE CASE WITH ATTACHMENTS

(71) Applicant: Gary J. Pontecorvo, Stockton, NJ (US)

(72) Inventor: Gary J. Pontecorvo, Stockton, NJ (US)

( * ) Notice: Subject to any disclaimer, the term of this patent is extended or adjusted under 35 U.S.C. 154(b) by 0 days.

(21) Appl. No.: 17/005,239

(22) Filed: Aug. 27, 2020

(51) Int. Cl.
*H04B 1/38* (2015.01)
*F16M 11/26* (2006.01)
*H04M 1/21* (2006.01)

(52) U.S. Cl.
CPC .............. *F16M 11/26* (2013.01); *H04M 1/21* (2013.01)

(58) Field of Classification Search
CPC ........ F16M 11/26; H04M 1/185; H04M 1/21; H04B 1/03; G06F 1/16
See application file for complete search history.

(56) References Cited

U.S. PATENT DOCUMENTS

| 8,485,404 B2 | 7/2013 | Monaco | |
|---|---|---|---|
| 9,237,786 B2 | 1/2016 | Kolton | |
| 9,485,557 B2 * | 11/2016 | Wilcox | H04M 1/04 |
| 2005/0255898 A1 | 11/2005 | Huang | |
| 2014/0376763 A1 * | 12/2014 | Stevinson | H04R 1/1033 381/370 |
| 2015/0172431 A1 * | 6/2015 | Huang | H04M 1/04 455/556.1 |
| 2015/0381779 A1 * | 12/2015 | Yang | A45C 11/00 455/575.8 |
| 2020/0404799 A1 * | 12/2020 | Hamilton | H05K 5/0226 |

FOREIGN PATENT DOCUMENTS

WO 2016166607 A1 10/2016

\* cited by examiner

*Primary Examiner* — Tuan Pham
(74) *Attorney, Agent, or Firm* — David Postolski, Esq.; Gearhart Law LLC

(57) ABSTRACT

An electronic device attachment system is described. The system includes an electronic device case configured to receive and house an electronic device. The electronic device is a smartphone, a laptop computer, a mobile media player, a tablet, or any other handheld electronic device. The system also includes a storage component affixed to the electronic device case either permanently or removably. The storage component is configured to receive and house one or more attachments when not in use.

11 Claims, 31 Drawing Sheets

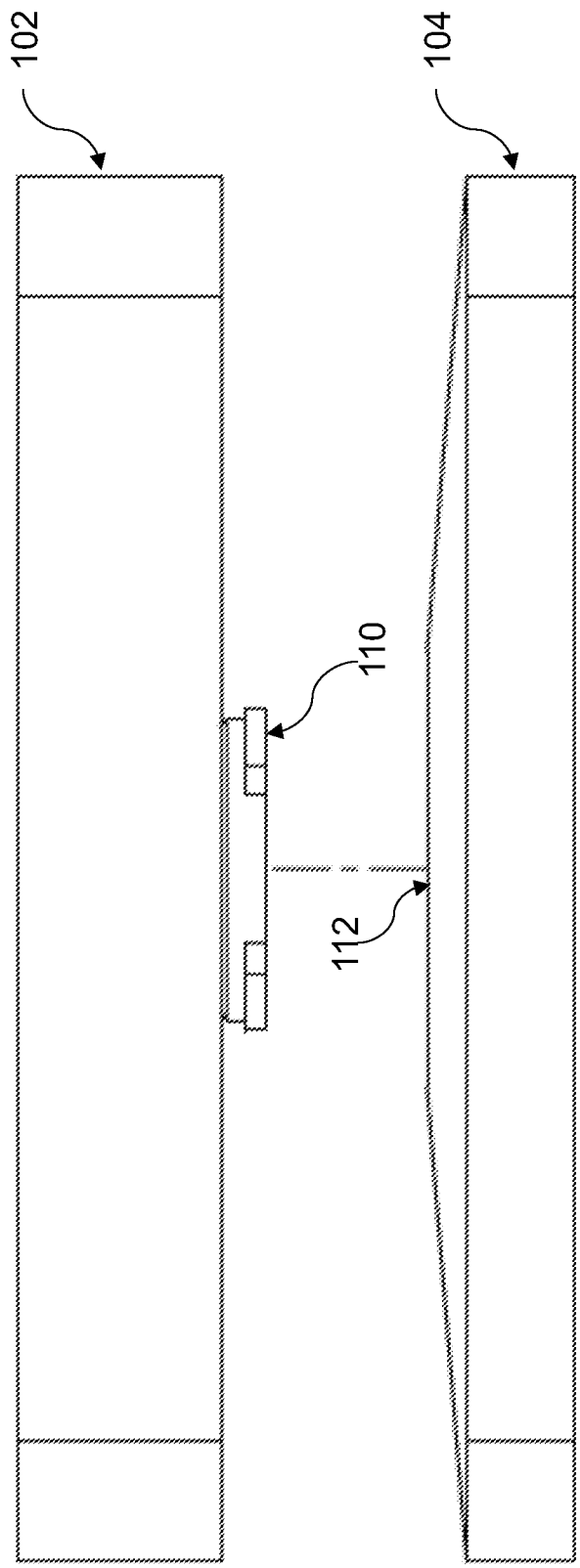

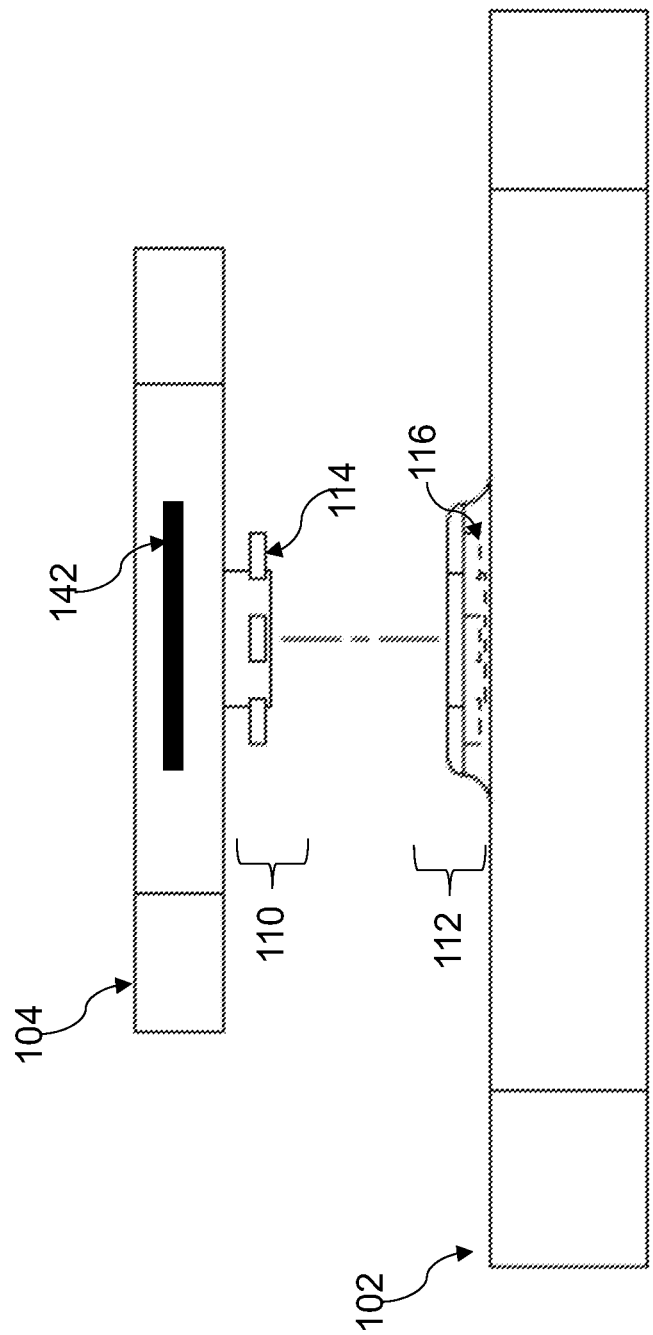

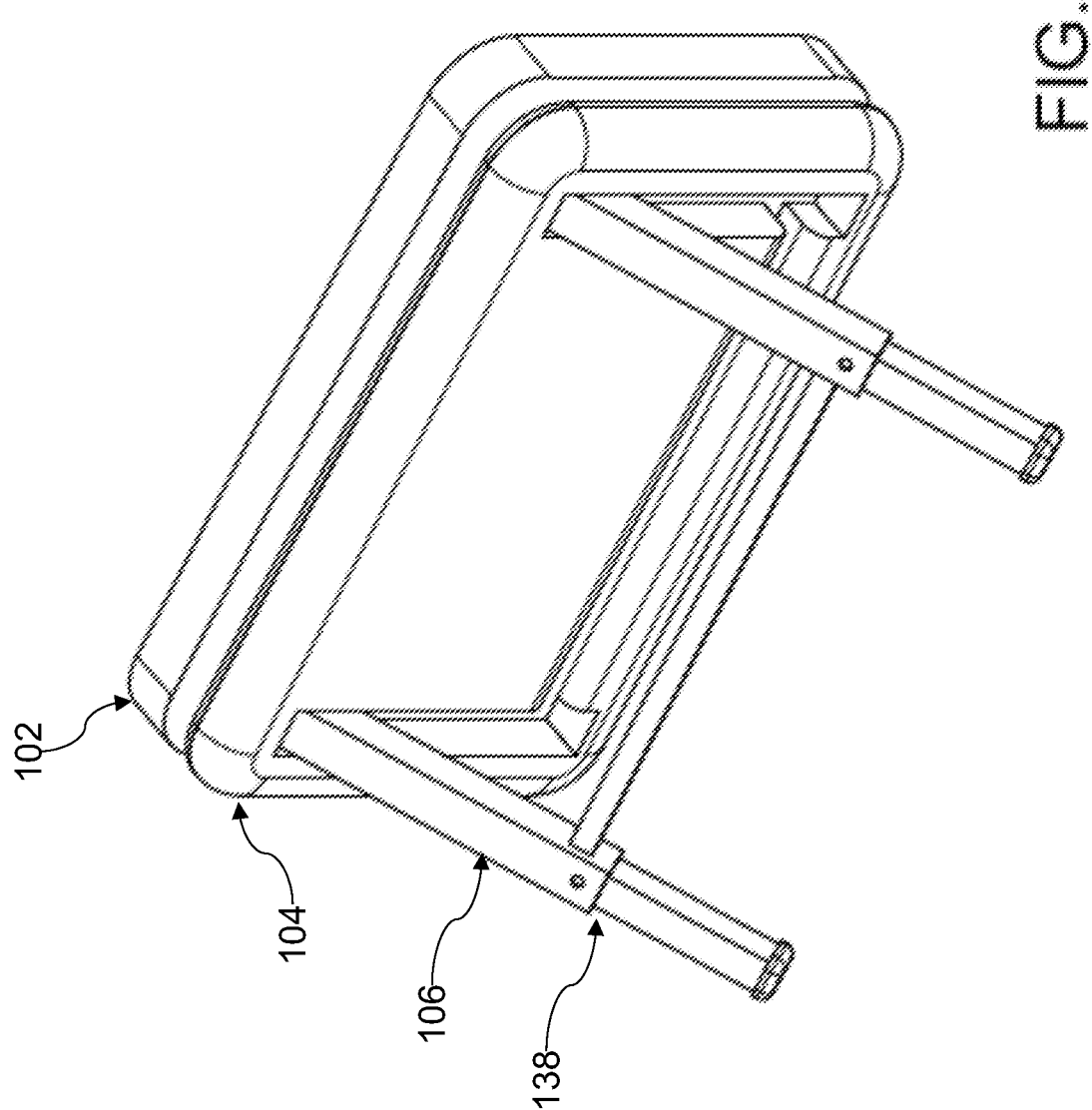

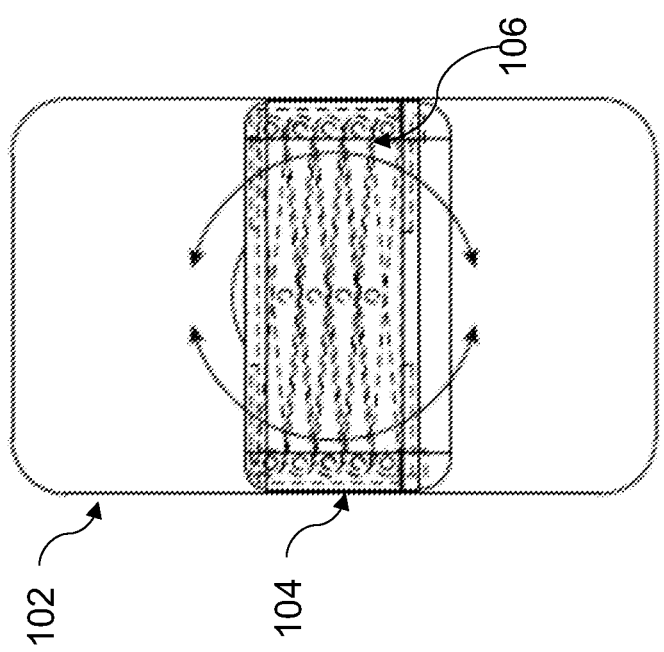

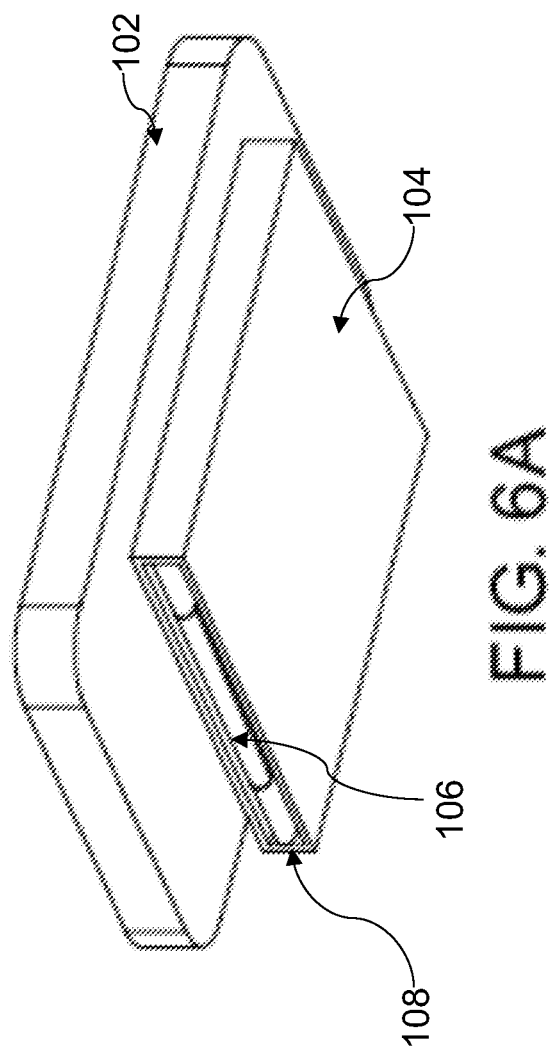

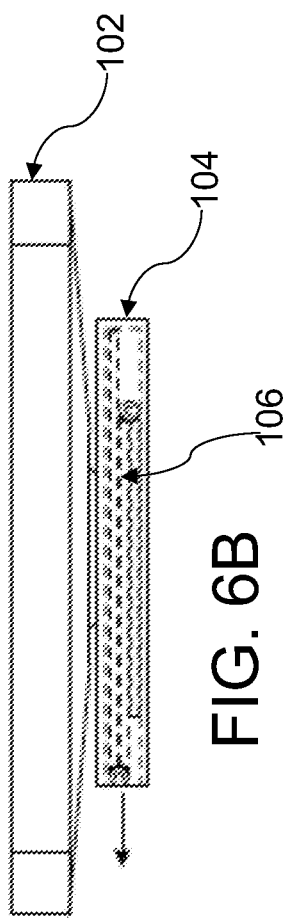

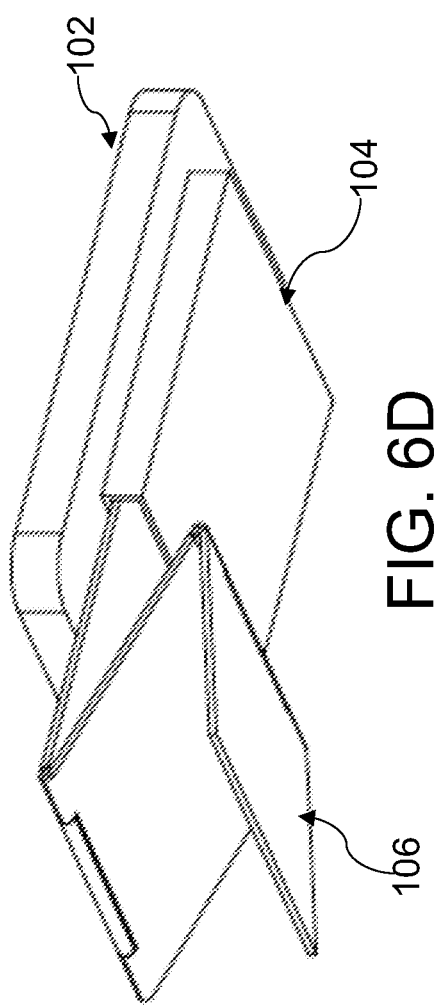

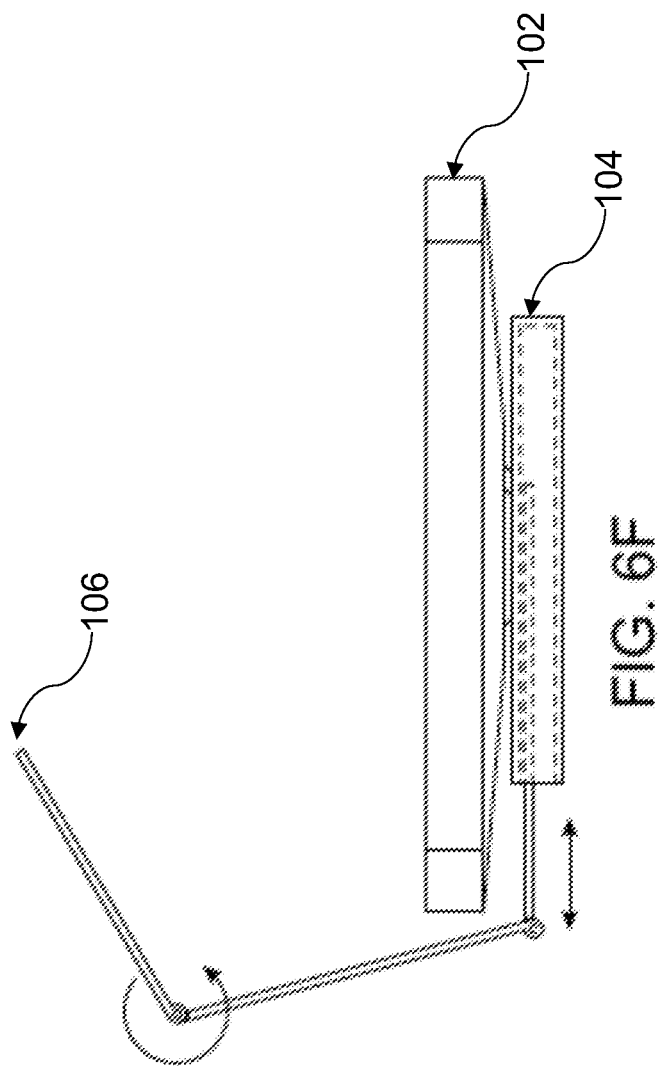

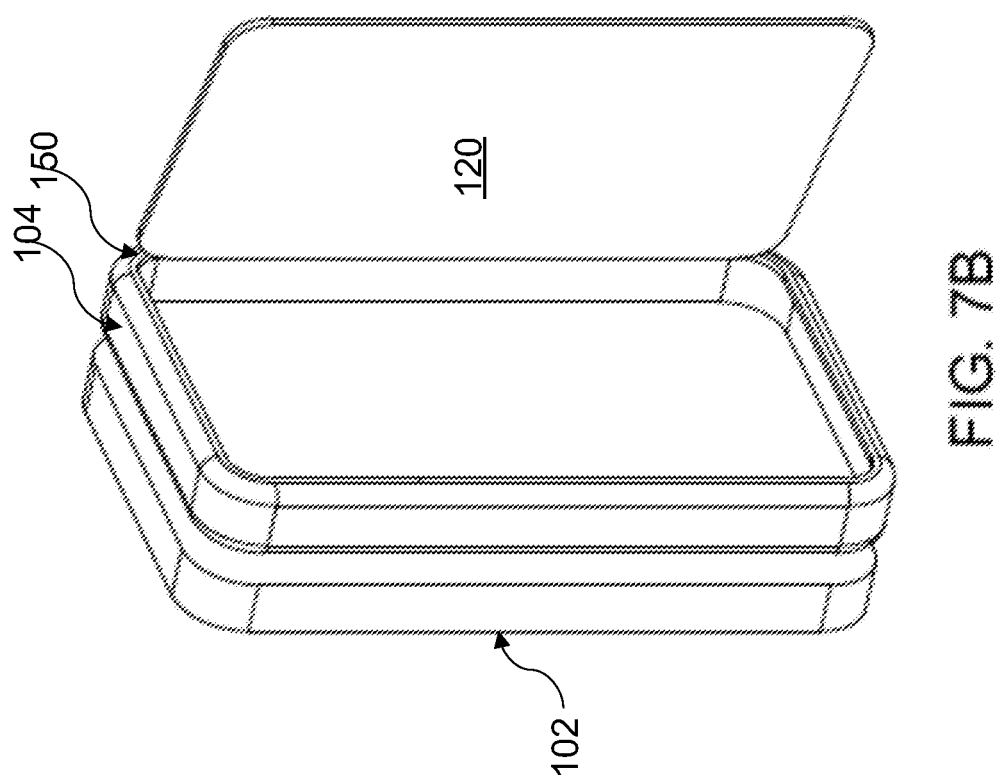

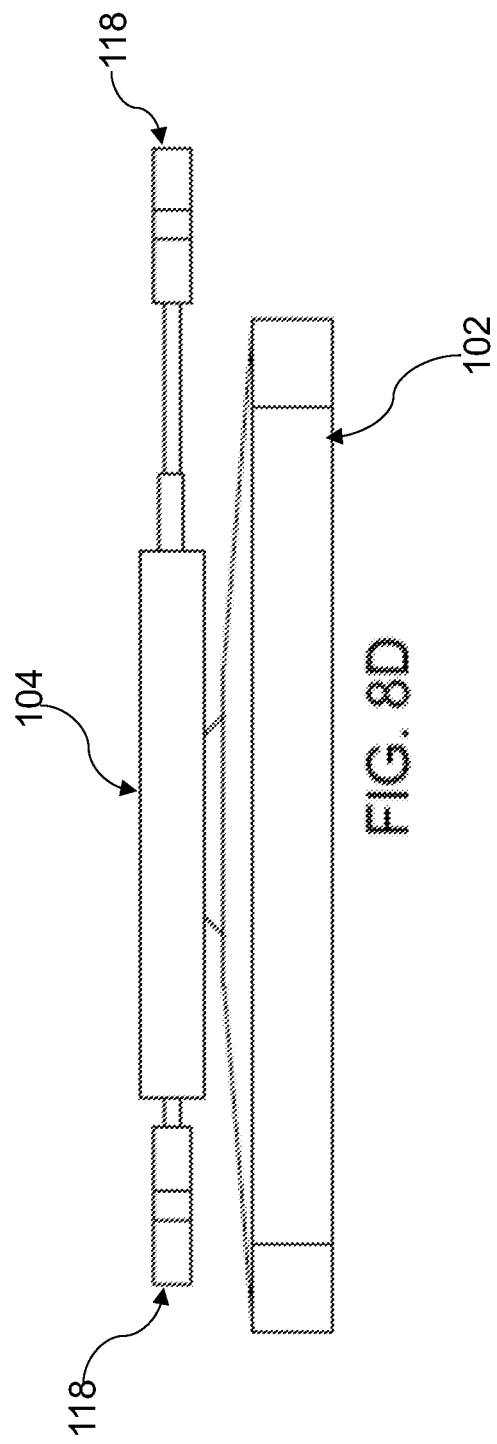

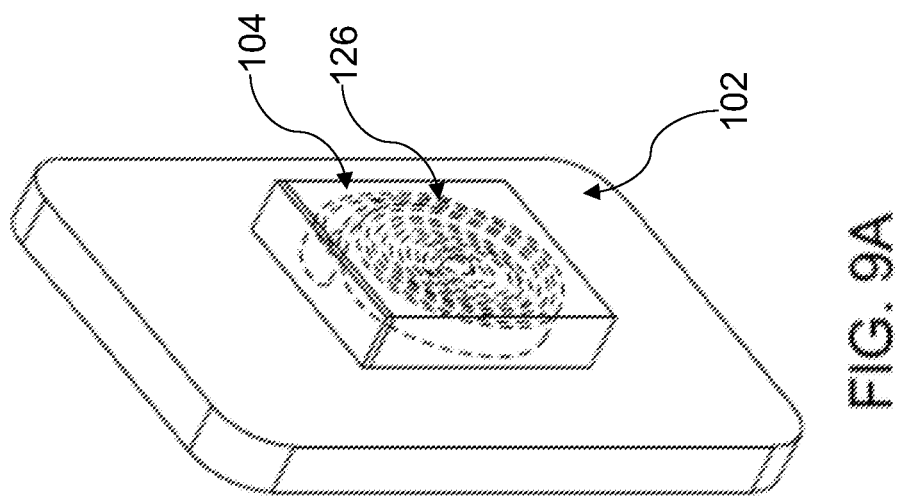

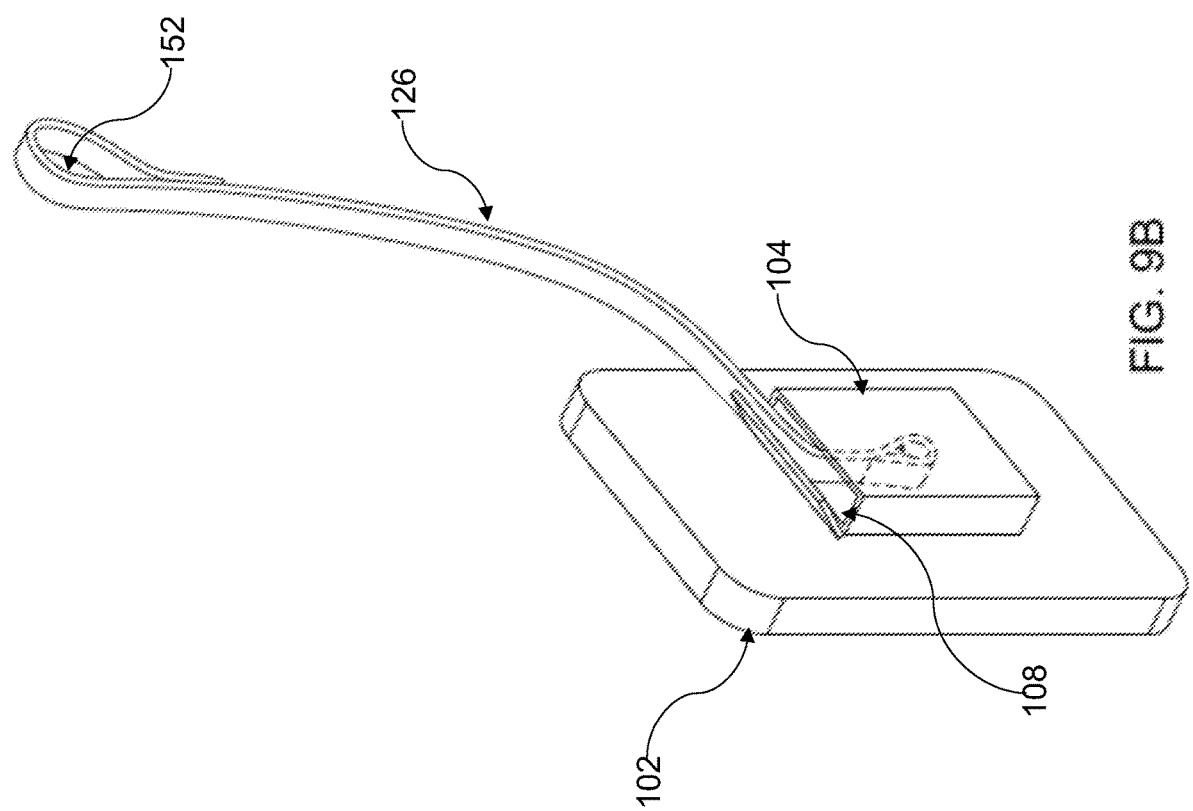

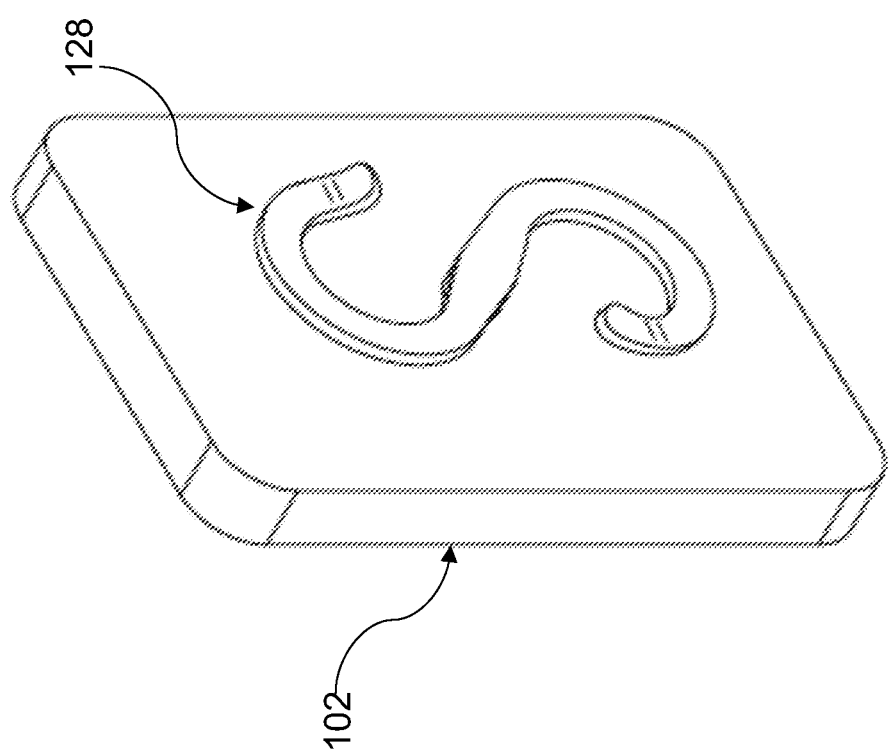

ELECTRONIC DEVICE CASE WITH ATTACHMENTS

FIELD OF THE EMBODIMENTS

The field of the invention and its embodiments relate to an electronic device attachment system. In particular, the present invention describes an improved electronic device attachment system that includes an electronic device case configured to receive and house an electronic device, a storage component affixed either removably or permanently to the electronic device case, and one or more attachments storable in the storage component when not in use.

BACKGROUND OF THE EMBODIMENTS

Smartphones, tablets, laptop computers, mobile media players, and other handheld electronic devices are popular and quite expensive. Due to the extensive use of these devices, some have developed cases to protect these electronic devices. However, most cases fail to provide additional functionality to the user wishing to engage with the electronic device and perform other tasks. Thus, what is needed is an improved electronic device attachment system that provides the user with multiple attachments and ways in which the user can interact with the electronic device, as well as complete other tasks.

REVIEW OF RELATED TECHNOLOGY

U.S. Pat. No. 8,485,404 B2 describes holders for supporting portable handheld electronic devices, such as, but not limited, to iPhones®, IPODS®, IPADS™, cellular phones, and the like. An embodiment of this invention has an upper compartment on a backplate with sleeve edges that allow both a retractable cord and headpiece (earphones, headset) to be both stored inside when not being used. A spring loaded type rewinder on the backplate with sleeve edges automatically retracts both the cord and headpiece into the compartment where a hinge attached lid hides and protects both the cord and headpiece when not being used. The backplate with sleeve edges can include an internal inwardly protruding male prong that is attached to cord so that sliding the portable handheld electronic device into the sleeve edges plugs the prong into a female socket on the portable handheld electronic device, and sliding the device out removes the socket from about the male prong.

U.S. Pat. No. 9,237,786 B2 describes a mobile device and peripheral hardware case and holder that comprises a panel section for attachment to the rear of peripheral hardware, such as a battery pack or amplifier. The panel member includes edges which slide in to rails of a mobile device case, which holds a mobile device, such as a cell phone or music player. The rails of the case include a stop for holding the panel section in an installed position and a corresponding locking arrangement biases the holder in a locked position. When assembled, the holder preserves the connections of the mobile device and peripheral hardware in proximity to each other.

U.S. Published Patent Application No. 2005/0255898 A1 describes a system that includes a cell phone holder. The cell phone holder has a backing plate and a cover forming a pocket for holding a cell phone. A cable retainer on the holder helps to retain a cable, such as portion of an earphone to the backing plate.

WO 2016/166607 A1 describes a remote camera control for a cell phone camera that is extendably attached to a cell phone case to retract into and be held in the cell phone case when not in use and may be extended from the cell phone case when in use.

Various electronic device cases and attachments exist in the art. However, their means of operation are substantially different from the present disclosure, as the other inventions fail to solve all the problems taught by the present disclosure.

SUMMARY OF THE EMBODIMENTS

The present invention and its embodiments relate to an electronic device attachment system. In particular, the present invention describes an improved electronic device attachment system that includes an electronic device case configured to receive and house an electronic device, a storage component affixed either permanently or removably to the electronic device case, and one or more attachments storable in the storage component when not in use.

A first embodiment of the present invention describes an electronic device attachment system. The electronic device attachment system includes: an electronic device case configured to receive and house an electronic device. In examples, the electronic device is a smartphone, a laptop computer, a mobile media player, a tablet, or any other handheld electronic device. The electronic device attachment system also includes a storage component affixed permanently or removably to the electronic device case. In some examples, the storage component is configured to receive and house one or more objects. The one or more objects may include a photograph, signage, ear buds, a credit card, a debit card, a business card, a driver's license, cash, coins, and/or medicine, among others not explicitly listed herein.

There are numerous methods of attachment of the storage component to the electronic device case. In some examples, the electronic device case comprises at least one receiver port and the storage component comprises at least one protrusion configured to engage the at least one receiver port to affix the storage component to the electronic device case. In other examples, the storage component comprises two or more attachment legs configured to engage the electronic device case to affix the storage component to the electronic device case. In further examples, the electronic device case comprises an attachment mechanism such that the storage component is affixed to the electronic device case via the attachment mechanism.

The electronic device attachment system also includes one or more attachments. Each of the one or more attachments comprise an in-use position and a non-use or stored position. Further, each of the one or more attachments are stored in the storage component when in the non-use or stored position. In some examples, engagement of a mechanism modifies the non-use position to the in-use position. The mechanism may include: a push button mechanism, a clip mechanism, a lever mechanism, a swinging door mechanism, or a sliding door mechanism, among other examples. In further examples, the mechanism may be detachable and interchangeable. When detachable, the mechanism may be stored in the storage component.

It should be appreciated that the storage component may include an opening for the one or more attachments to enter the storage component when in the non-use position and to exit the storage component when in the in-use position. Furthermore, the storage component may include a flap component or a door component configured to seal the opening. Each of the one or more attachments may include:

a holder component affixed to an expansion and retraction mechanism, one or more telescoping locking leg stands, an electronic device stand, a finger support component, a privacy component to block a screen of the electronic device, at least one finger grip opening, a clip component being configured to affix to a belt of a user, an adjustable grip, a finger holder, a hand strap, a speaking privacy shield, one or more suction cups, a lanyard, or a secure clip, among others not explicitly listed herein.

In an example, the attachment comprises the holder component affixed to the expansion and retraction mechanism. The expansion and retraction mechanism may be stored in the storage component and is configured to move the holder component from a first position within the storage component to a second position away from the storage component. Moreover, the holder component is configured to be held in a hand of a user. Further, the expansion and retraction mechanism may include at least one swing arm, at least one expandable swing arm, at least one telescoping arm, or at least one scissor arm, among other examples not explicitly listed herein. Additionally, the holder component further comprises a locking mechanism configured to lock the holder component at the second position and/or a movement mechanism configured to move the holder from the first position to the second position. The locking mechanism and the movement mechanism are not limited to any particular mechanisms and multiple mechanisms are contemplated herein.

In an additional example, the attachment comprises the one or more telescoping locking leg stands. The one or more telescoping locking leg stands are affixed to an interior of the storage component and have an ability to pivot to allow each of the one or more telescoping locking leg stands to be moved in differing angles relative to the storage component. In some examples, the attachment comprises the electronic device stand. The electronic device stand allows the electronic device to be placed at an angle in relation to a surface the electronic device is resting on. In some examples, the angle is 90 degrees. In other examples, the angle is approximately 90 degrees.

In a further example, the attachment is the finger support component. The finger support component comprises: at least one extendable wing configured to receive at least one finger of a user, an automated mechanism to move the at least one extendable wing from a non-use position to an in-use position, and a locking mechanism to lock the at least one extendable wing in the in-use position. The automated mechanism may include: a button, an activator, a spring, or a lever, among other examples. In some examples, the attachment may include the at least one finger grip opening. The at least one finger grip opening is configured to receive at least one finger on a hand of a user while a portion of the hand of the user engages the electronic device case to hold the electronic device in a vertical position or in a horizontal position.

In general, the present invention succeeds in conferring the following benefits and objectives.

It is an object of the present invention to provide an improved electronic device attachment system.

It is an object of the present invention to provide an improved electronic device attachment system comprising an electronic device case configured to receive and house an electronic device, a storage component affixed to the electronic device case, and one or more attachments.

It is an object of the present invention to provide an improved electronic device attachment system comprising one or more attachments, where the one or more attachments have an in-use and a stored or non-use position.

It is an object of the present invention to provide an improved electronic device attachment system comprising one or more attachments, where the one or more attachments have an in-use and a stored or non-use position, and where the one or more attachments are stored within the storage component when in the stored or the non-use position.

It is an object of the present invention to provide an improved electronic device attachment system comprising one or more attachments, where the one or more attachments may be rotated via an attachment mechanism to move from a stored or non-use position to an in-use position.

It is an object of the present invention to provide an improved electronic device attachment system comprising an electronic device case configured to receive and house an electronic device, a storage component affixed to the electronic device case, and one or more attachments configured to be stored in the storage component, where the storage component is rotatable on the improved electronic device attachment system.

BRIEF DESCRIPTION OF THE DRAWINGS

FIG. 2A and FIG. 2B depicts a schematic diagram of a first embodiment of an attachment system to affix a storage component to an electronic device case, according to at least some embodiments described herein.

FIG. 2D depicts a schematic diagram of a third embodiment of an attachment system to affix a storage component to an electronic device case, according to at least some embodiments described herein.

FIG. 3B depicts a schematic diagram of an attachment comprising a leg stand of an electronic device attachment system, the attachment being in a use position outside of a storage component of the electronic device attachment system, according to at least some embodiments described herein.

FIG. 4A and FIG. 4B depict schematic diagrams of an attachment comprising an extendable holder component of an electronic device attachment system, the attachment being stored in a non-use position in a storage component of the electronic device attachment system, according to at least some embodiments described herein.

FIG. 6A depicts a schematic diagram of an attachment comprising a privacy shield of an electronic device attachment system, the attachment being stored in a non-use position in a storage component of the electronic device attachment system, according to at least some embodiments described herein.

FIG. 6B, FIG. 6C, FIG. 6D, and FIG. 6E depict schematic diagrams of a means to remove an attachment comprising a light or privacy shield of an electronic device attachment system from a storage component of the electronic device attachment system for use, the light or privacy shield being used to protect a privacy of a screen of the electronic device and/or to prevent light from washing out the screen of the electronic device, according to at least some embodiments described herein.

FIG. 6F depicts a schematic diagram of an attachment comprising a privacy shield of an electronic device attachment system, the attachment being in a use position outside of a storage component of the electronic device attachment system, according to at least some embodiments described herein.

FIG. 7A and FIG. 7B depict schematic diagrams of a storage component comprising a cover, according to at least some embodiments described herein.

FIG. 8B, FIG. 8C, and FIG. 8D depict schematic diagrams of a means to remove an attachment comprising finger holder component of an electronic device attachment system from a storage component of the electronic device attachment system for use, according to at least some embodiments described herein.

FIG. 9A depicts a schematic diagram of an attachment comprising a lanyard of an electronic device attachment system, the attachment being stored in a non-use position in a storage component of the electronic device attachment system, according to at least some embodiments described herein.

FIG. 9B depicts a schematic diagram of an attachment comprising a lanyard of an electronic device attachment system, the attachment being in a use position outside of a storage component of the electronic device attachment system, according to at least some embodiments described herein.

FIG. 10 depicts a schematic diagram of an attachment comprising an S-shaped clip of an electronic device attachment system, according to at least some embodiments described herein.

DESCRIPTION OF THE PREFERRED EMBODIMENTS

Figure 1A:
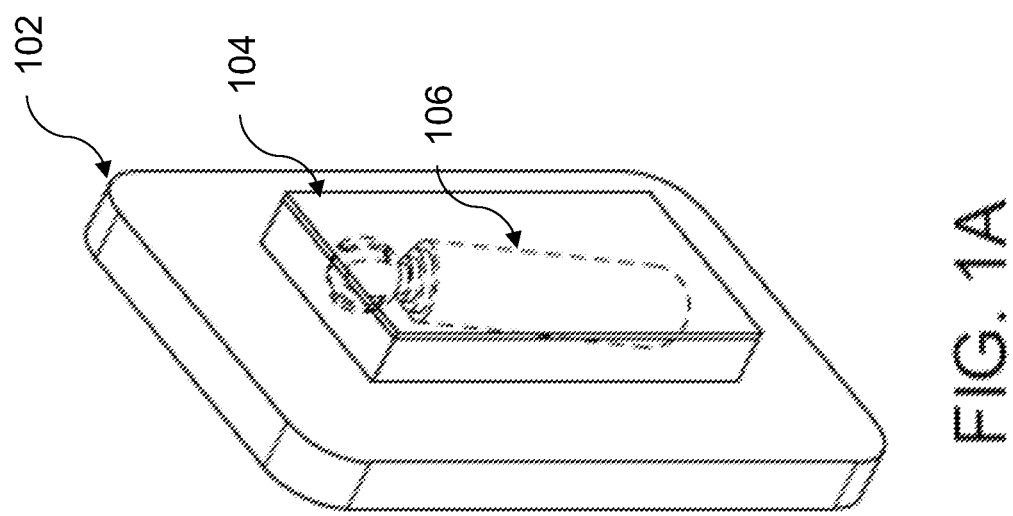
FIG. 1A depicts a schematic diagram of an attachment comprising a holder component of an electronic device attachment system, the attachment being stored in a non-use position in a storage component of the electronic device attachment system, according to at least some embodiments described herein.

The preferred embodiments of the present invention will now be described with reference to the drawings. Identical elements in the various figures are identified with the same reference numerals. Reference will now be made in detail to each embodiment of the present invention. Such embodiments are provided by way of explanation of the present invention, which is not intended to be limited thereto. In fact, those of ordinary skill in the art may appreciate upon reading the present specification and viewing the present drawings that various modifications and variations can be made thereto.

It should be appreciated that arrows depicted in the Figures correspond to rotation or movement in a direction the arrow head is pointing.

Electronic Device Attachment System

An electronic device attachment system is described and depicted in FIG. 1A-FIG. 10. Generally, the electronic device attachment system comprises an electronic device case 102 configured to receive and house an electronic device. In examples, the electronic device is a smartphone, a laptop computer, a mobile media player, a tablet, or any other handheld electronic device. The electronic device attachment system may also include a storage component 104 permanently or removably affixed to the electronic device case.

Numerous methods of affixing the storage component 104 to the electronic device case 102 are contemplated. Some of such mechanisms or methods are depicted in FIG. 2A, FIG. 2B, FIG. 2C, FIG. 2D, and FIG. 3A. For illustrative purposes, the storage component 104 may include two or more attachment legs (not shown) that are configured to engage the electronic device case 102 to affix the storage component 104 to the electronic device case 102. A quantity of the two or more attachment legs is non-limiting. In other scenarios, the electronic device case 102 may include an attachment mechanism such that the storage component 104 is affixed to the electronic device case 102 via the attachment mechanism. The attachment mechanism may be any such mechanism known to one having ordinary skill in the art.

In additional examples, and as depicted in FIG. 2A, FIG. 2B, FIG. 2C, and FIG. 2D, the electronic device case 102 may comprise at least one protrusion 110 and the storage component 104 may include at least one receiver port 112 such that the at least one protrusion 110 engages the at least one receiver port 112 to affix the electronic device case 102 to the storage component 104. In other examples, the electronic device case 102 may comprise the at least one receiver port 112 and the storage component 104 may comprise the at least one protrusion 110 such that the at least one protrusion 110 engages the at least one receiver port 112 to affix the electronic device case 102 to the storage component 104.

Figure 2A:
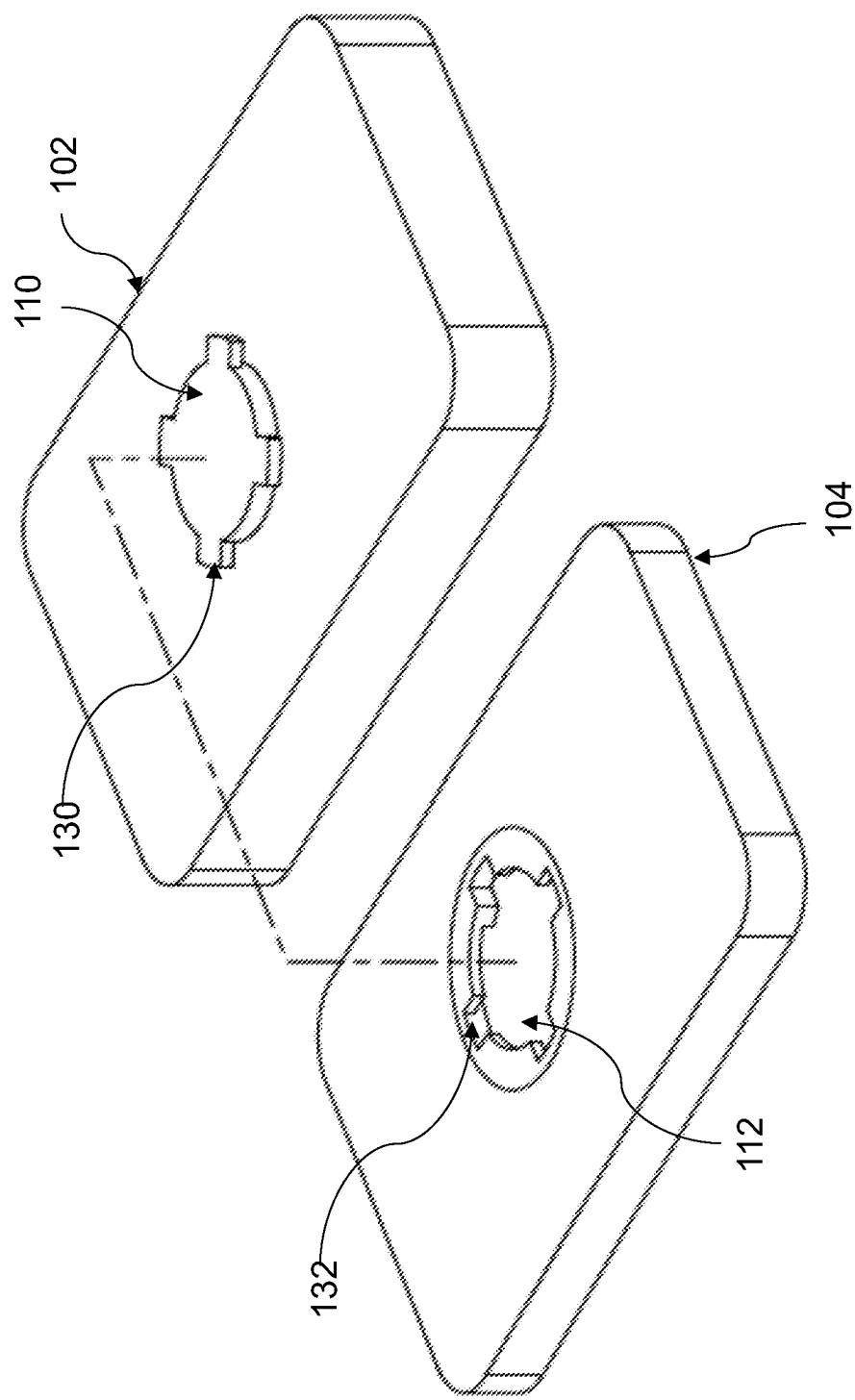

In an example and as depicted in FIG. 2A and FIG. 2B, the at least one protrusion 110 comprises one or more male portions 130 and the at least one receiver port 112 may comprise one or more female portions 132 such that the one or more male portions 130 of the at least one protrusion 110 are received by the one or more female portions 132 of the at least one receiver port 112 to affix the storage component 104 to the electronic device case 102. In other examples, the one or more male portions 130 of the at least one protrusion 110 are received by the one or more female portions 132 of the at least one receiver port 112, and then, pressure is applied to the storage component 104 and the storage component 104 is rotated to affix the storage component 104 to the electronic device case 102.

Figure 2C:
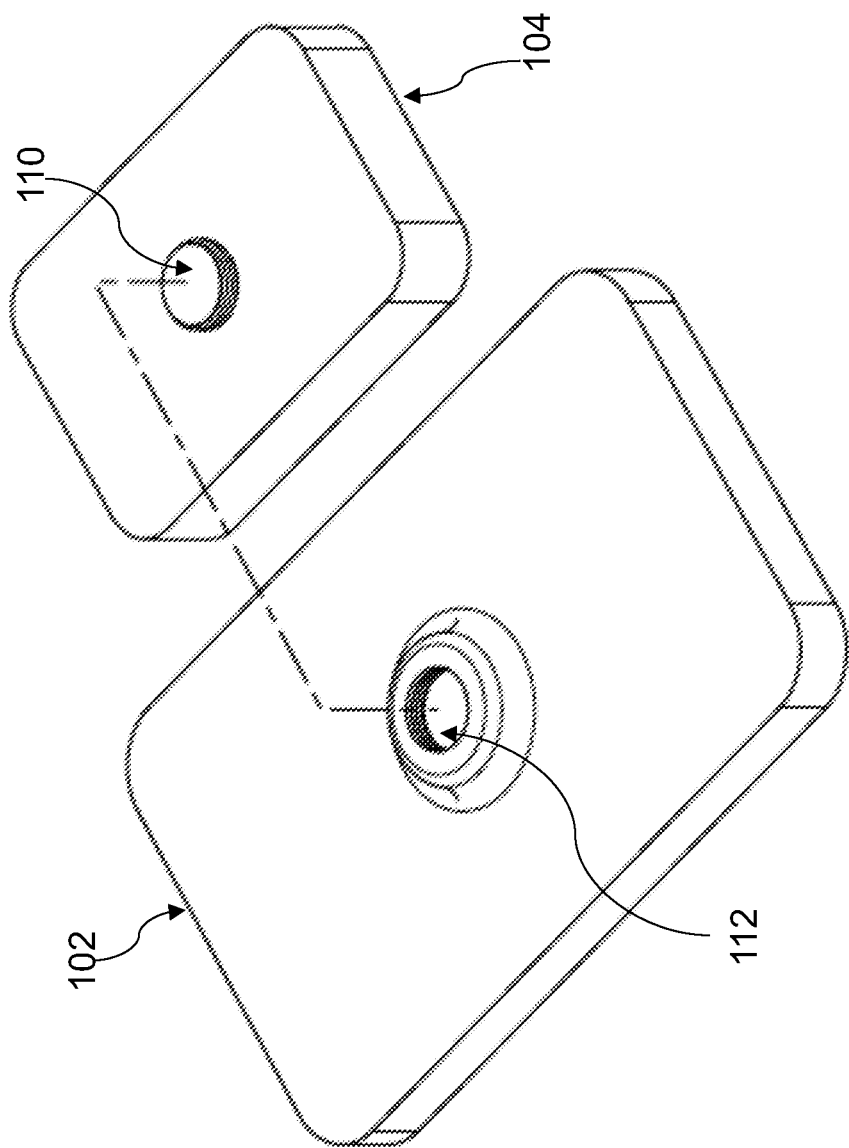
FIG. 2C depicts a schematic diagram of a second embodiment of an attachment system to affix a storage component to an electronic device case, according to at least some embodiments described herein.

In some examples and as depicted in FIG. 2C, the at least one receiver port 112 may be threadably engaged with the at least one protrusion 110 to affix the storage component 104 to the electronic device case 102.

In other examples and as depicted in FIG. 2D, the at least one protrusion 110 may comprise one or more notches 114. A quantity of the one or more notches 114 is not limited to any particular quantity. In some examples, the at least one protrusion 110 may comprise four notches spaced equidistant from one another. In this example, the at least one receiver port 112 may comprise one or more concave recessions 116 within an interior of the at least one receiver port 112. A quantity of the one or more concave recessions 116 is not limited to any particular quantity. In some examples, a user may push down on the storage component 104 and twist the storage component 104 such that the one or more notches 114 are received by the one or more concave recessions 116 to affix the storage component 104 to the electronic device case 102. The one or more notches 114 may allow for multiple locking positions of the storage component 104 in relation to the electronic device case 102, which allows the user to modify an orientation of the storage component 104 in relation to the electronic device case 102.

In additional examples, a receiver component may be affixed to the storage component 104. In these scenarios, the receiver component is received by the at least one receiver port 112 of the electronic device case 102 such that the storage component 104 is affixed to the electronic device case 102. In some examples, the receiver component may comprise one or more notches above its outer top surface. In further examples, the storage component 104 may be rotated in via a mechanism in relation to the electronic device case 102 and may be secured in differing positions in relation to the electronic device case 102.

In further examples, the electronic device attachment system may comprise a holder component. The holder component is not affixed to the electronic device case and may be carried on ones' person. In examples, the holder component may be stored and transported in a user's backpack, pocketbook, or other personal carrying device. The holder component may be configured to house and transport the storage component 104 and/or the one or more attachments 106.

In examples, the holder component comprises a sleeve system having one or more compartments and a flap securable in a closed position with a securement mechanism (such as Velcro). The one or more compartments are configured to house and transport the storage component 104 and/or the one or more attachments 106. In other examples, a shell of the holder component may be manufactured with writing, symbols, designs, and/or advertisements of the users and/or manufactures choosing. When the user wishes to utilize an attachment 106, he/she removes it from the holder component and attaches it to the receiver component described herein. If the attachment 106 was previously attached to the receiver component, the user may remove the attachment 106 and may place the attachment 106 into the holder component for storage.

Attachments

The storage component 104 may also be configured to house one or more attachments 106. The one or more attachments 106 may be used with the electronic device attachment system described herein. The one or more attachments 106 may include a holder component (of FIG. 1A and FIG. 1B), a holder component affixed to an expansion and retraction mechanism (of FIG. 4A, FIG. 4B, FIG. 4C, and FIG. 4D), one or more telescoping locking leg stands (of FIG. 5A, FIG. 5B, and FIG. 5C), an electronic device stand (of FIG. 3A, FIG. 3B, and FIG. 3C), a finger support component (of FIG. 8A, FIG. 8B, FIG. 8C, and FIG. 8D), a privacy component (of FIG. 6A, FIG. 6B, FIG. 6C, FIG. 6D, FIG. 6E, and FIG. 6F) to block a screen of the electronic device 102, at least one finger grip opening, a clip component being configured to affix to a belt of a user, an adjustable grip, a finger holder component, a hand strap, a speaking privacy shield, one or more suction cups, a lanyard (of FIG. 9A and FIG. 9B), and/or a secure clip (of FIG. 10), among others. Each of the one or more attachments 106 may include an in-use position (e.g., the user is interacting with the attachment 106) and a non-use position (e.g., the attachment 106 is not being used by the user and/or is stored). Further, each of the one or more attachments 106 are stored in the storage component 104 when in the non-use position.

Engagement of a mechanism modifies the stored or non-use position of the attachment 106 to the in-use position. The mechanism may include a push button mechanism, a clip mechanism, a lever mechanism 142 (of FIG. 2D), a swinging door mechanism, or a sliding door mechanism, among other mechanisms not explicitly listed herein. It should be appreciated that in some examples, the mechanism is detachable and may be stored in the storage component 104 or in another component (not shown). In other examples, the mechanism is interchangeable with another mechanism.

Moreover, it should be appreciated that the storage component 104 may comprise an opening 108 (of FIG. 1B, FIG. 5A, FIG. 5B, FIG. 5C, FIG. 6A, FIG. 8C, and FIG. 9B) for the one or more attachments 106 to enter the storage component 104 when in the non-use position and to exit the storage component 104 when in the in-use position. The storage component 104 may also include a flap component or a door component 144 (see FIG. 5B) configured to seal the opening 108. In additional examples, the storage component 104 may be rectangular in shape, square in shape, or circular in shape. However, the shape of the storage component 104 is not limited to any particular shape.

It should be appreciated that in some examples, the storage component 104 is affixed to a portion of the electronic device case 102 on a first side. The first side of the electronic device case 102 is disposed opposite a second side, where the second side receives the electronic device therein. It should be appreciated that each of the components of the electronic device attachment system described herein may comprise a material, such as: a plastic material, a metal material, a fiberglass material, or another material not explicitly listed herein. Examples of the one or more attachments 106 will be described herein.

Example 1

Figure 1B:
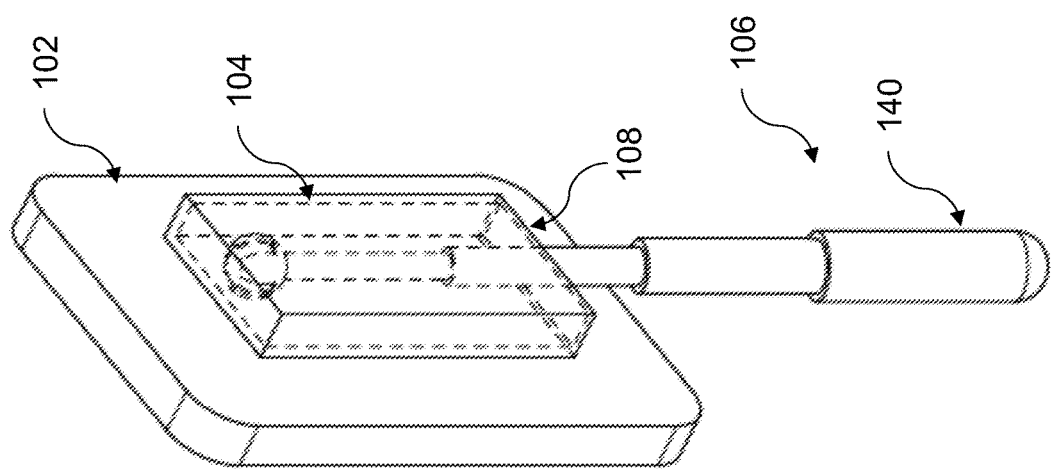
FIG. 1B depicts a schematic diagram of an attachment comprising a holder component of an electronic device attachment system, the attachment being in a use position outside of a storage component of the electronic device attachment system, according to at least some embodiments described herein.

In a first example, the attachment of the one or more attachments 106 comprises the holder component (of FIG. 1A and FIG. 1B). In some examples, the holder component may be affixed to an expansion and retraction mechanism (of FIG. 4A, FIG. 4B, FIG. 4C, and FIG. 4D). The holder component allows the electronic device to be held in a hand of the user extended away from a body of the user for viewing the electronic device, communicating with others via the electronic device, taking selfies with the electronic device, etc. Such holder component allows the user to hold the electronic device in a position that eliminates a need to look down to the electronic device and strain a neck of the user.

Figure 4A:
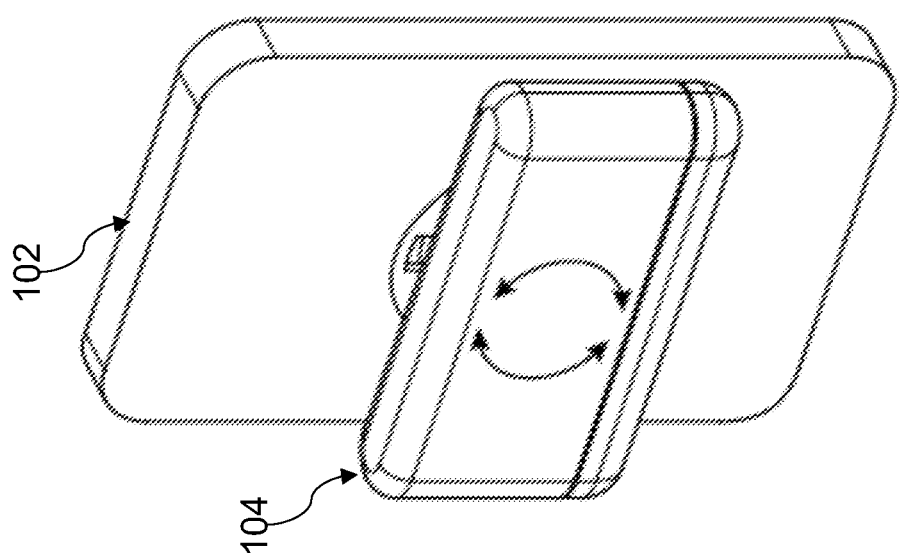
Figure 4C:
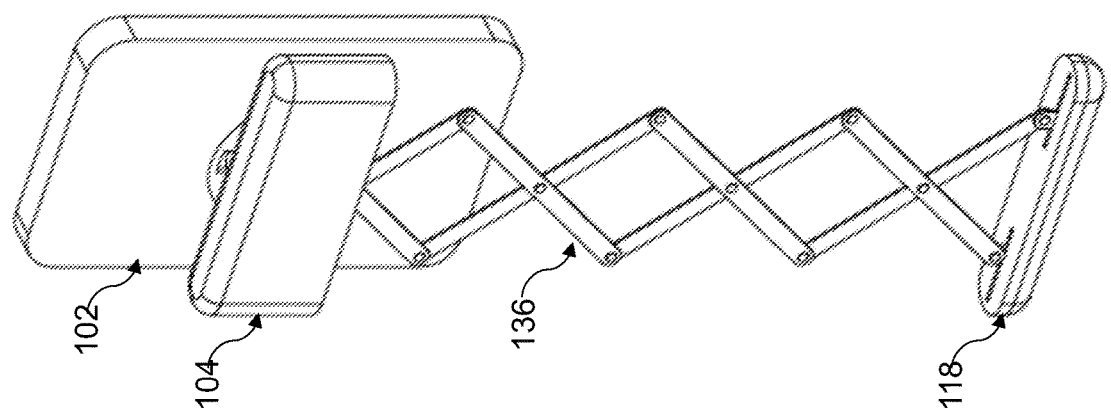
FIG. 4C and FIG. 4D depicts a schematic diagram of an attachment comprising an extendable holder component of an electronic device attachment system, the attachment being in a use position outside of a storage component of the electronic device attachment system, according to at least some embodiments described herein.
Figure 4D:
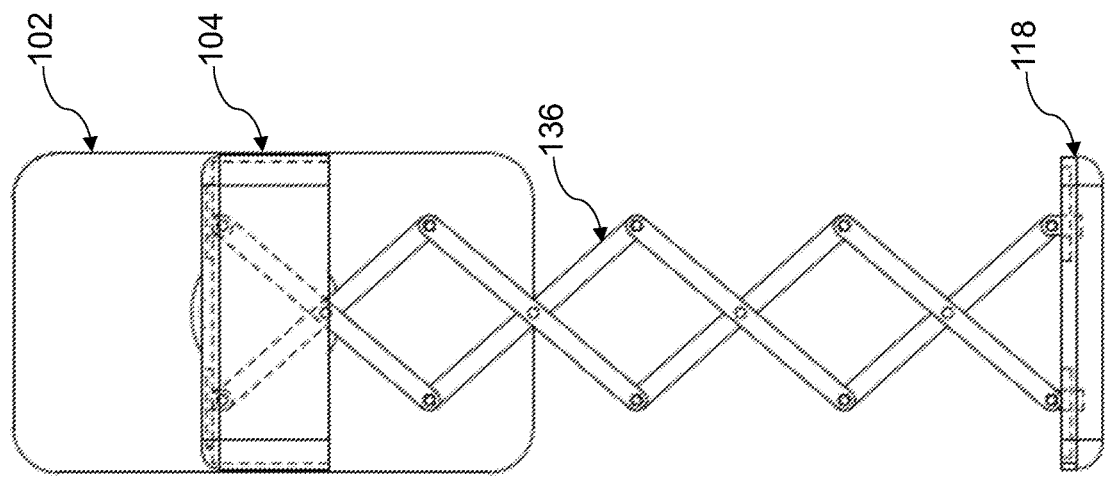

The expansion and retraction mechanism 136 is stored in the storage component 104 and is configured to move the holder component from a first position within the storage component 104 to a second position away from the storage component 104. The expansion and retraction mechanism 136 may include: at least one swing arm, at least one expandable swing arm, at least one telescoping arm, and/or at least one scissor arm (as depicted in FIG. 4C and FIG. 4D), among other examples not explicitly listed herein. It should be appreciated that a quantity of the at least one swing arm, the at least one expandable swing arm, the at least one telescoping arm, and/or the at least one scissor arm is non-limiting and numerous quantities are contemplated herein. Moreover, the at least one swing arm, the at least one expandable swing arm, the at least one telescoping arm, and/or the at least one scissor arm may be manufactured with the storage component 104 as a singular component. In other examples, the at least one swing arm, the at least one expandable swing arm, the at least one telescoping arm, and/or the at least one scissor arm may be manufactured as separate components.

In some examples, the attachment of the one or more attachments 106 may also comprise a locking mechanism 138 (as depicted in FIG. 3B). The locking mechanism 138 may be configured to lock the attachment at an extended position away from the electronic device case 102. The locking mechanism 138 may include a spring-loaded button, a push button, a locking twist system, among others. In other examples, the attachment of the one or more attachments 106 may also comprise a movement mechanism configured to move the attachment 106 (e.g., holder component) from the first position to the second position, the second position being further away from the electronic device case 102.

Expansion and Retraction Mechanisms
Swing Arm

As explained supra, the expansion and retraction mechanism 136 may include the at least one swing arm. The at least one swing arm may be stored within the storage component 104 when in the stored or non-use position and may swing down in a perpendicular position in relation to the storage component 104. In some examples, the at least one swing arm may be manufactured to be secured to an interior of the storage component 104. In examples, a securing clip or mechanism may be used to store the at least one swing arm in the interior of the storage component 104 when in the non-use position.

In some examples, the storage component 104 may be rectangular in shape such that each of the at least one swing arm is attached as close as possible to a wall of a short side of the rectangle to allow the at least one swing arm to have a greatest length possible. However, it should be appreciated that a shape of the storage component 104 is not limited to the examples disclosed herein.

An end of each of the at least one swing arm comprises a pivot point and can be secured to the storage component 104 by numerous methods, such as a pin system. The pin system allows each of the at least one swing arm to swing at approximately a 45 degree angle. An opposite end of the pivot point includes the holder component (e.g., the attachment 106). The holder component may be manufactured with a grip 140 (of FIG. 1B and FIG. 5C) and/or a handle 118 (of FIG. 4C and FIG. 4D), which the user may grasp. In some examples, the handle 118 may have a "U" shape configuration. However, the shape of the handle 118 is not limited to any particular shape or configuration. Moreover, the material comprising the grip 140 and/or the handle 118 is not limited to any particular material.

In further examples, the expansion and retraction mechanism 136 may include the at least one extendable swing arm. In an example, the at least one extendable swing arm may include the at least one telescoping arm. In some examples, a stabilizer component may be placed between two of the at least one expandable swing arm to allow the user to grip the grip 140 or the handle 118 with one hand. In examples, the stabilizer component may be manufactured as a separate component and may be configured to slide into female receiver components on an interior of two of the at least one expandable swing arm when extended. The stabilizer component may also be stored inside of the storage component 104. In another example, the two of the at least one expandable swing arm may be manufactured with the stabilizer component. The stabilizer component may be connected to one of the at least one swing arm with a pivot point.

In further examples, the stabilizer component may not be used. In this scenario, the user may grip and squeeze the at least one expandable swing arm when the attachment 106 is in the in-use position. When in the non-use position, the at least one swing arm may be secured to an interior of the storage component 104 by one or more securing clips.

Scissor Arm

In other examples, and as explained supra, the expansion and retraction mechanism 136 may include the at least one scissor arm. Each of the at least one scissor arm may be manufactured with a similar size, length, and shaped sections that are connected to each other to form a network of scissor arm sections. The network of the scissor arm sections move freely to extend and retract. Each of the least one scissor arm may include an opening at each end to facilitate the pivot system to be installed within it.

Each of the least one scissor arm may be affixed to the storage component 104 (e.g., via a direct attachment). For example, the first two of the at least one scissor arm may not be connected to each other, but may be secured to an interior of the storage component 104 at the pivot point. The first two of the at least one scissor arm may be affixed to a farthest point opposite a side/edge of the storage component 104. The at least one scissor arm may be attached by a means that allows each arm to move freely from its non-use position to the in-use position, such as: via a rivet, a screw system with a washer, or a screw system without a washer, among others.

In some examples, a telescoping bar component may be used and may be affixed to the first two of the at least one scissor arm, allowing the first two of the at least one scissor arm to extend and collapse freely. In other examples, a scissor bar stopper component may be used. The scissor bar stopper component comprises a notch at each end. The notch may receive a locking pin inserted therein such that the locking pin secures the scissor bar stopper component, when fully expanded. This configuration allows a first section of the at least one scissor arm to traverse a width of the storage component, providing additional length to the at least one scissor arm for the user to utilize.

The at least one scissor arm may be affixed to the handle 118 via direct attachment, among other methods. The handle 118 may be attached or affixed to the storage component 104 via the locking pin system described herein or a clip system, among others not explicitly listed herein. For example, the clip system may be manufactured with a locking arm component attached to each side of the "U" shape configuration of the handle 118, which may extend from an upper part of the "U" shape configuration and flare out to a bottom part of the "U" shape configuration, allowing the locking arm component to be depressed against the "U" shape configuration and return to its original position when it is not depressed.

In some examples, the locking arm component may comprise a locking block component that may be located on an exterior of the locking arm component, facing away from a remainder of the handle 118. The locking block component may be manufactured in various shapes and sizes, but may be sized so as to fit into a complimentary locking block notch component. The locking block notch component may be manufactured into the storage component 104 to align with the locking block component and receive the "U" shape configuration ends of the handle 118.

The end of the locking arm component will extend out of the storage component 104, allowing it to be accessed and depressed when the handle 118 is in the stored and non-use position in the storage component 104. Accordingly, when the user wants to place the attachment 106 in the in-use position, the user may depress the locking arm component, releasing the locking block component from the locking block notch component and allowing the user to pull the handle 118 and extend the at least one scissor arm or the at least one telescoping arm away from the attachment 106 to view, interact, and utilize the mobile or electronic device.

For the user to utilize the scissor arm configuration fully extended and in the in-use configuration, the user may utilize the locking mechanism, similar to the locking mechanism described in relation to the at least one swing arm of Example 1. The locking mechanism for the at least one scissor arm of Example 1 may include: a nut and screw mechanism, a twist lock mechanism, or a lock bar mechanism, among others. In examples, the nut and screw mechanism may be manufactured to connect each pivot point of each scissor arm section to another or at least a middle pivot point, which connects four of the scissor arm sections. In examples, the nut component can be manufactured to be stationary against the inner most scissor arm section in relation to the user.

The screw component can be manufactured to enter the nut component from an opposite side of the nut component, which is the outer most scissor arm section in relation to the user. Moreover, the screw component may be threadable into the nut component. When the screw component is tightened into the nut component, the screw component collapses the scissor arm sections against each other, locking them in place and stabilizing the scissor arm attachment. Loosening the screw component allows the scissor arm sections to move freely again and to be placed in the stored position in the storage component 104. It should be appreciated that the screw component may be manufactured with various types of heads, which allow the user to easily tighten and loosen it. One type of head of the screw component can be a wing configuration, allowing the user to place his/her fingers on each side of the wing.

As explained, the locking mechanism of Example 1 for the at least one swing arm may alternatively be the twist lock mechanism. The twist lock mechanism may be manufactured to connect each pivot point of each scissor arm section to the other or at least the middle pivot points, which connect four scissor arm sections. The twist lock mechanism may be manufactured to secure each scissor arm section to a round or other shaped base component with a rivet or screw system, which is flush to the base component in relation to the user facing the scissor arm system. The remainder of the scissor arm section can be flat, but may be in a perpendicular relationship to the base component. The rivet/screw system will secure the scissor arm sections equally in each quadrant of the round base component.

The spring system may attach to the round base component and a twist lock cap component. The twist lock cap component can also be round or may include the same shape of the base component and have the other end of the spring system attached to it. This configuration allows the twist lock cap component to be pulled and twisted away from the base component and retracted back on the base component.

In an illustrative example, an interior of the twist lock cap component comprises four walls. It should be appreciated that a quantity of four is being used for the walls, but the quantity is non-limiting. Each of the four walls, when retracted by the spring system, will sit securely on the base component. Each of the four walls may be configured in an extended double "Y" configuration. Each end of the double "Y" configuration may be configured to fit between and against scissor arm section after the rivet/screw system.

As the cap component is pulled from the base component and twisted, the four walls pass over the scissor arm section. Whichever position the cap component is retracted against the base component determines which movement of the scissor arm sections is stopped by the four walls. Accordingly, when the scissor arm system is not locked and can expand from and retract into the storage component, the double "Y" configuration will be in a horizontal in relation the user. When the user wants to lock the scissor arm system, the user may pull the cap component away from the base component and may twist the cap component approximately 45-degrees in either direction, causing the four walls to sit between the scissor section arms and stop them from collapsing or expanding.

Further, the locking mechanism of Example 1 for the at least one swing arm may alternatively be the lock bar mechanism. In this example, one or more lock bar components may be used and a quantity of the one or more lock bar components is non-limiting. For example, a lock bar component can be attached on either or both sides of the pivot points of the scissor arm system in relationship to the user. Moreover, the lock bar component can also be manufactured to not be initially attached to any pivot points, but stored separately in the storage component 104. When the one or more lock bar components are secured between two pivot points, the one or more lock bar components stops the scissor arm system from collapsing. Depending on the configuration, the lock bar component can have one end with a hole or opening to be secured to the pivot point and the opposing end to be manufactured with an open or closing hook system that can be attached and removed from an extended pivot point or it can be manufactured with both open or closing hook systems.

In some examples, the lock bar component may have two open or closing hook systems. In this scenario, the lock bar component may be attached to the side facing the user when the scissor arm system is in the in-use position. The lock bar component will be attached at the pivot point and may be able to move with the scissor arm sections as it is adjacent to allow the scissor arm system to be in the in-use and stored position.

The pivot point system in this configuration may have an extended end to allow a drop bar component to attach to it. In the in-use position, the drop bar component can be secured on the outside pivot point below or above it to secure the scissor arm system. To place in the stored position, the user removes the drop bar component from the pivot point and retracts the scissor arm system into the storage component 104.

The one or more lock bar components may be stored inside of the storage component 104 and may be removed when the scissor arm system is extended to the in-use position. In this scenario, the one or more lock bar components may be placed on any two extended end pivot points to stop the scissor arm system from collapsing. In a preferred embodiment, the one or more lock bar components may be used to secure it to two or more sets of middle pivot points.

Telescoping Arm

In other examples, and as explained supra, the expansion and retraction mechanism 136 may include the at least one telescoping arm. The at least one telescoping arm may be affixed to the interior of the storage component 104 at one end and may be affixed to the handle 118 at the other end. The at least one telescoping arm may be manufactured from circular or rectangular tubing or other types of tubing. In this examples, the handle 118 may be attached and secured to the storage component 104. The handle 118, when secured, can be manufactured to be flush with the storage component 104.

The at least one telescoping arm may be manufactured to attach to the interior of the storage component 104 in numerous methods. For example, the at least one telescoping arm may be affixed to the interior of the storage component 104 via adhesive, pins, rivets, etc. In other examples, the storage component 104 may include one or more female tube cup components manufactured as part of the storage component 104.

The one or more female tube cup components may be located anywhere within the storage component 104, but opposite the holder component to ensure a second section of the circular or rectangular tubing can retract into a first section of the circular or rectangular tubing and so on. The first section of the circular or rectangular tubing can be secured into the one or more female tube cup components by any means. In an example, the one or more female tube cup components can be manufactured to hold the at least one telescoping arm to connect to the holder component at a right angle or another angle by offsetting the base component of the one or more female tube cup components.

With the described telescoping section locking system, the one or more female tube cup components and each telescoping section except the last telescoping section can be manufactured with at least one or more vertical depressed channel(s) from a top to bottom of the one or more female tube cup components and each telescoping section on the inside or on the outside of it. At least one or more horizontal depressed channel(s) can also be manufactured across the one or more female tube cup components and each telescoping section creating at least one channel cross on the inside or on the outside of it. The horizontal channel(s) can be manufactured around the entire inner or outer circumference of the one or more female tube cup components and telescoping section(s) or a partially amount of the circumference. Depending on the inner or outer positioning of the vertical and horizontal channel(s) for the one or more female tube cup components and the telescoping section(s), at least one or more corresponding protrusions, which fit within the vertical and horizontal depressed channel(s), can be manufactured onto each telescoping channel.

The last telescoping section may be manufactured with swivel type fitting at the end of it, allowing the last telescoping section to turn freely while attached to the holder component. This configuration allows the telescoping section locking system described herein to be utilized. An example of a swivel type fitting can include a post with an end attached to the handle 118. The opposite side of the post can have a disk and/or disk with ball bearing which may fit inside the last telescoping section within a horizontal channel allowing the last telescoping section to turn and remain attached to the handle 118.

To extend each telescoping section from the storage component 104 to the desired position, the interior or exterior protrusions in the telescoping section are aligned inside the vertical depressed channel of each telescoping section to allow the last telescoping section, which is attached to the handle component, to pass through each telescoping section of the at least one telescoping arm to its desired position. When the telescoping section is extended to the desired position, the at least one telescoping arm is locked by aligning each of the interior or exterior protrusions with the horizontal channel of the preceding telescoping section and the one or more female tube cup components causing the at least one telescoping arm to be locked at the desired position. This action can be repeated for each of the at least one telescoping arm, allowing the user's handle 118 to be positioned as desired by the user to hold the handle 118.

Example 2

In this second example, the attachment is substantially similar to Example 1. However, Example 2 further includes an extender component, allowing the user to hold the electronic device at a greater distance than what is possible in Example 1.

The handle component (e.g., the handle 118) of this Example 2 may be manufactured with a female cross system on a side opposing a side where the scissor arm system or the telescoping system attaches. The female cross system can be manufactured with at least two open slots and at least two closed slots. It should be appreciated that a quantity of the open and closed slots is non-limiting. The at least two open slots and the at least two closed slots align with a male cross system described herein. The female cross system can be manufactured anywhere in the handle component. However, in preferable embodiments, the female cross system can be manufactured in a center of the handle 118.

Moreover, in some examples, the handle 118 may include at least two female locking pin slots that run across a short length of the handle 118. The at least two female locking slots can be located anywhere in the handle 118. However, in preferable embodiments, the at least two female locking slots can be manufactured in a center of the handle 118 between the female cross system and an end of the handle 118.

The extender component may contain, internally, either the scissor arms or telescoping arms systems described in Example 1. The extender component may be manufactured with a male cross system and at least two male locking pegs. The male cross system and the at least two male locking pegs match their female equivalents described above in the handle 118.

The extender component may be secured within the attachment 106 by the locking bar system (described in Example 1). When the locking system is engaged, the extender component is free to be extracted away from the attachment 106. To place the extender component from the stored and non-use position to the in-use position, the handle 118 must be accessible. In the illustrative description provided, the handle 118 may be fully extended into the in-use position.

The user may be configured to slide the at least two male locking pegs in the extender component out of their resting position to their most extended position. The user may then marry the male cross system of the extender component with the at least two female locking slots of the handle component and twist the attachment 118 until the male cross system is secured. The user may then push in the at least two male locking pegs into the at least two female locking slots in both the handle component and the extender component.

The user may then release the extender component and pull the attachment 106 away from the electronic device with one hand, while the other hand holds the handle 118. The user may then pull the attachment 106 until the scissor/telescoping bar is secured and the locking system replaces the original location of the extender component. The user may now utilize the electronic device in any desired position extended a greater distance away from the attachment of Example 1.

Example 3

Figure 3A:
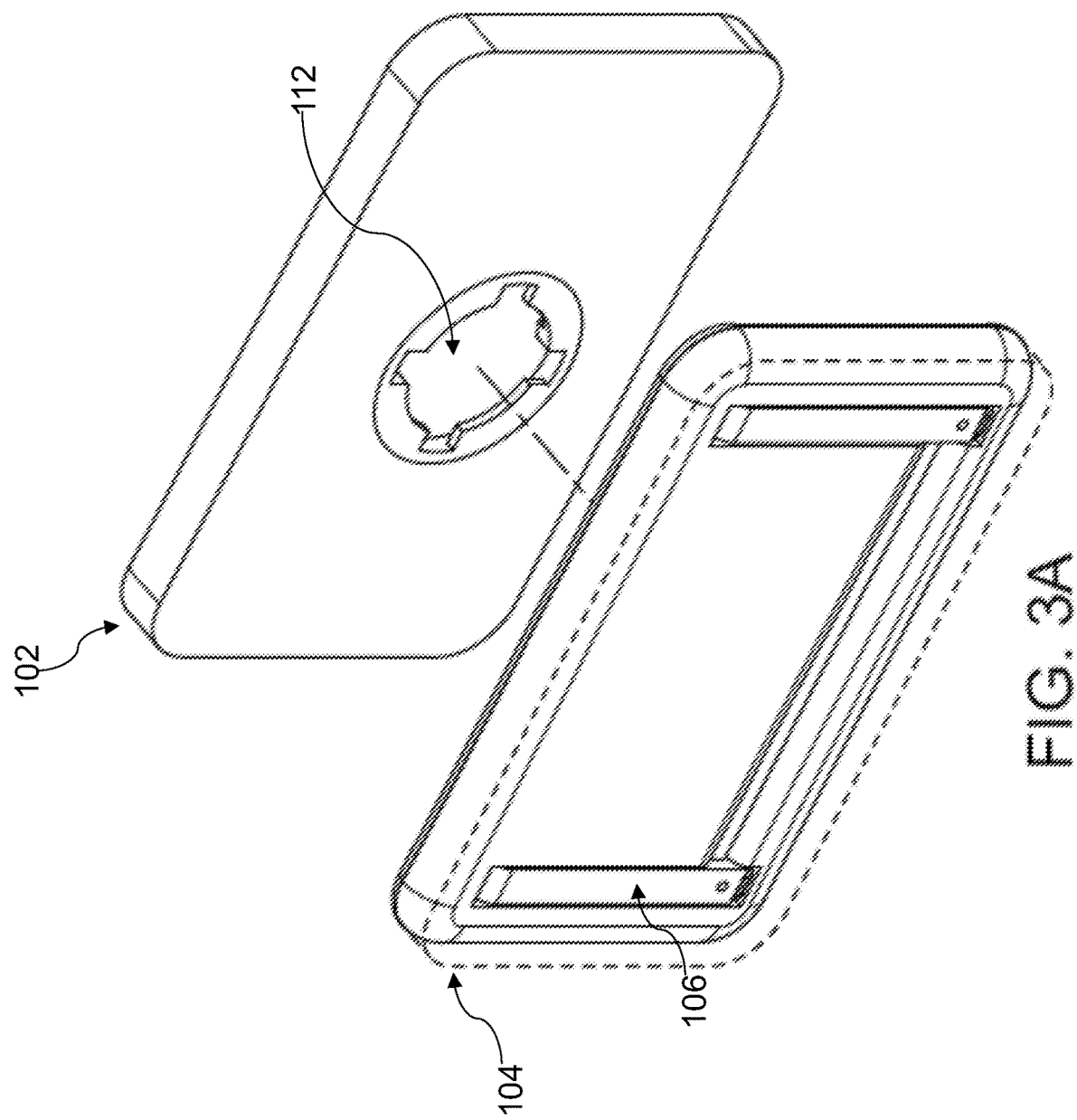
FIG. 3A depicts a schematic diagram of an attachment comprising a leg stand of an electronic device attachment system, the attachment being stored in a non-use position in a storage component of the electronic device attachment system, according to at least some embodiments described herein.
Figure 3C:
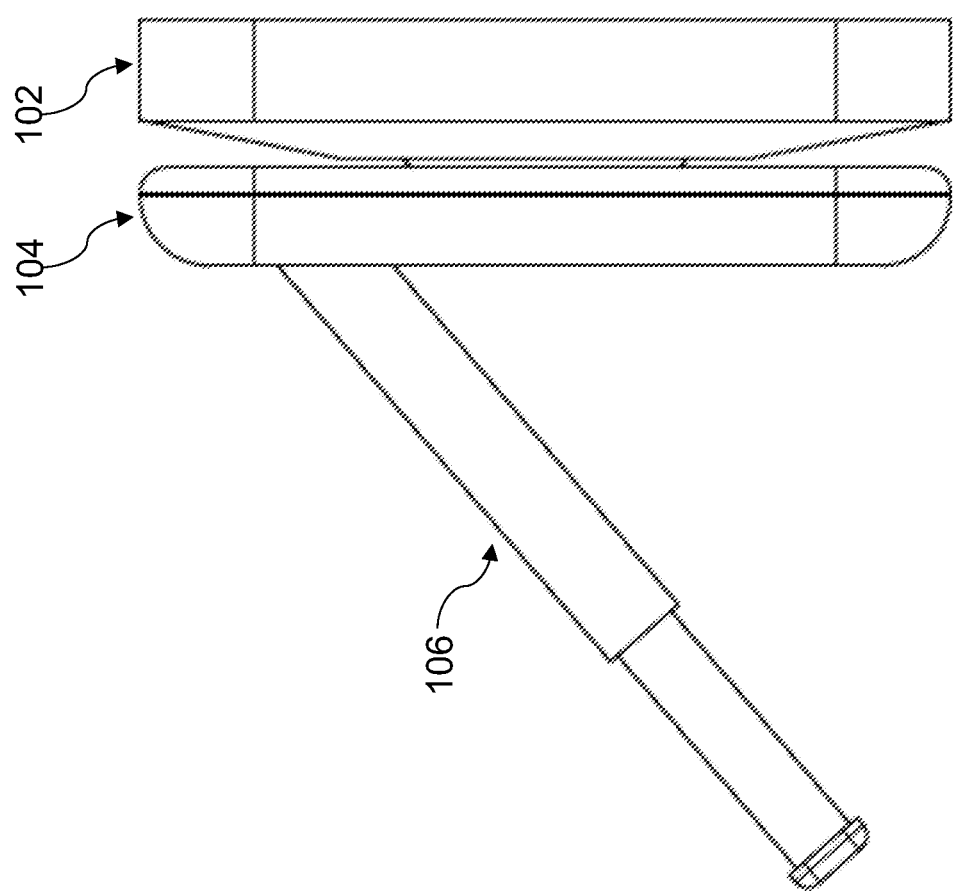
FIG. 3C depicts a schematic diagram of side view of an attachment comprising a leg stand of an electronic device attachment system, the attachment being in a use position outside of a storage component of the electronic device attachment system, according to at least some embodiments described herein.

In a third example, the attachment 106 includes an electronic device stand (of FIG. 3A, FIG. 3B, and FIG. 3C). The electronic device stand allows the electronic device to be supported above a solid surface in different user-friendly positions by locking the electronic device stand in different positions. This allows the user to view the electronic device without holding it and/or interact with the electronic device with his/her hands and fingers. As an illustrative example, this attachment 106 may be used when the user is eating and wishes to view/interact with the electronic device. The user may also interact with the electronic device stand to place the electronic device in a perpendicular or approximately 90-degree angle to the surface the electronic device is supported on.

Figure 5A:
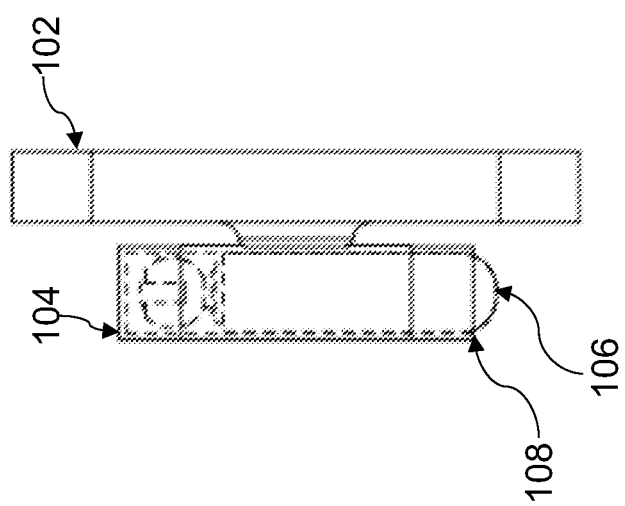
FIG. 5A depicts a schematic diagram of a side view of an attachment comprising telescoping leg components of an electronic device attachment system, the attachment being stored in a non-use position in a storage component of the electronic device attachment system, according to at least some embodiments described herein.
Figure 5B:
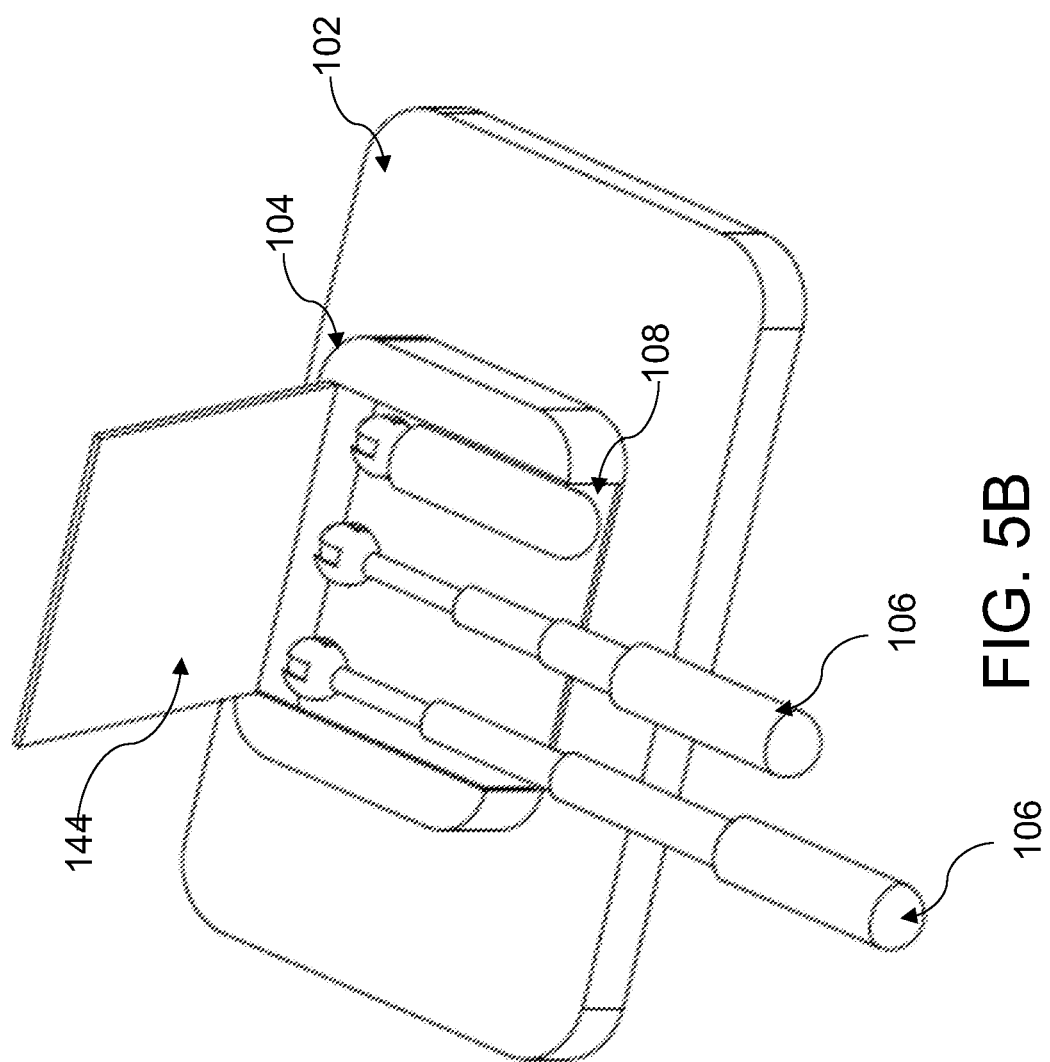
FIG. 5B depicts a schematic diagram of a means to remove an attachment comprising telescoping leg components of an electronic device attachment system from a storage component of the electronic device attachment system for use, according to at least some embodiments described herein.
Figure 5C:
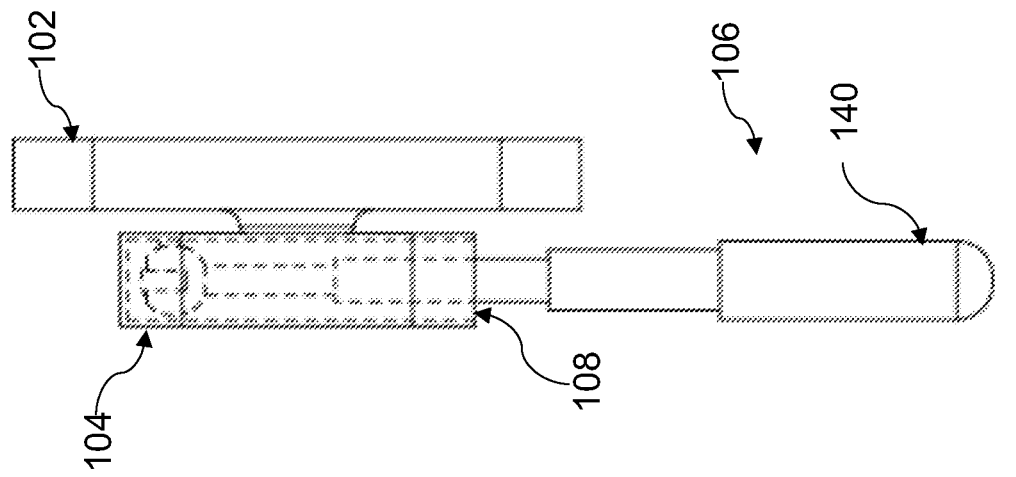
FIG. 5C depicts a schematic diagram of a side view of an attachment comprising telescoping leg components of an electronic device attachment system, the attachment being in a use position outside of a storage component of the electronic device attachment system, according to at least some embodiments described herein.
Figure 6C:
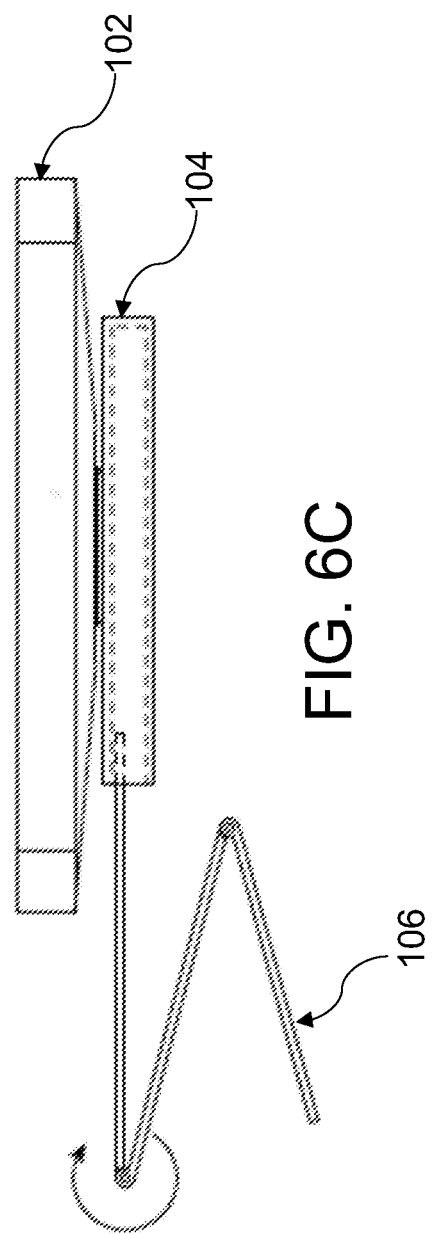
Figure 6E:
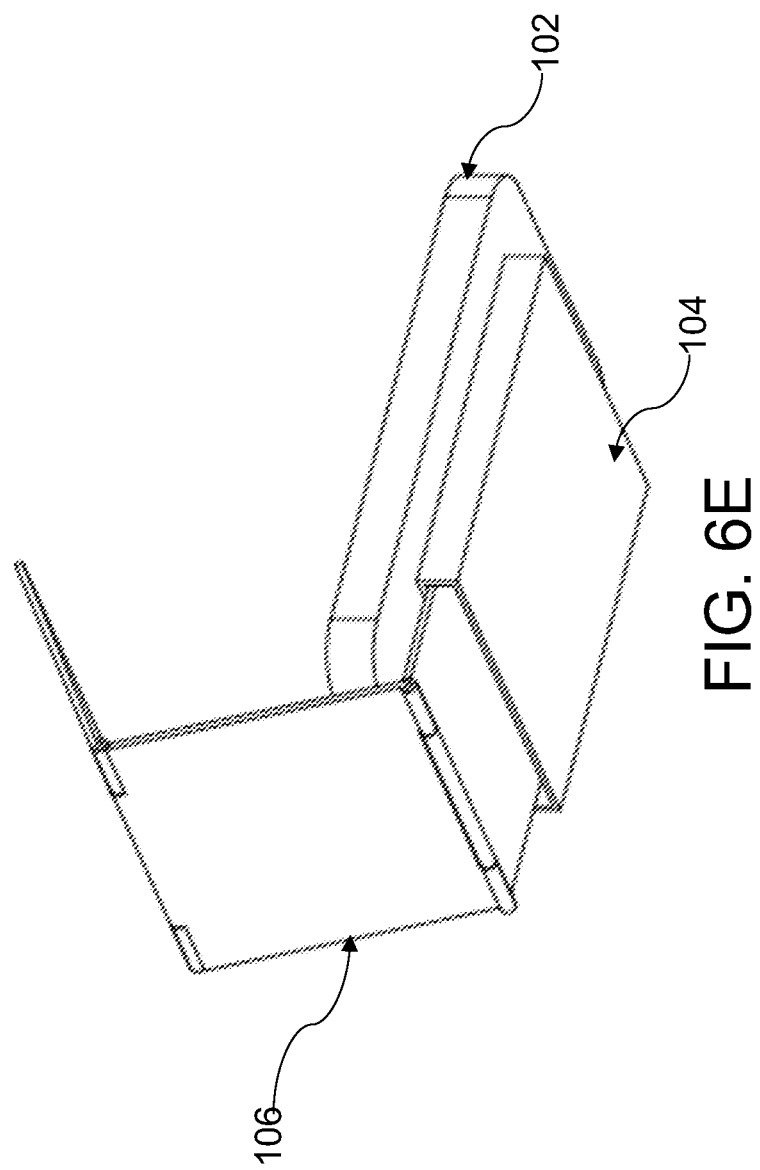

A specific implementation of Example 3 includes the electronic device stand comprising a telescoping locking leg stand (of FIG. 5A, FIG. 5B, and FIG. 5C). When in the non-use position, the telescoping locking leg stand may be stored within the storage component 104. The telescoping locking leg stand may include one or more legs. Moreover, the telescoping locking leg stand may be affixed to the interior of the storage component 104 and may be configured to pivot with and without the one or more female tube cup components, as described in Example 1.

In an illustrative example, the telescoping locking leg stand can telescope with a largest telescoping section secured in the storage component 104 or the opposite a smallest telescoping section can be secured in the storage component 104. This end of the telescoping locking leg stand can be manufactured with the ability to pivot, potentially utilizing a ball and socket system, allowing each of the one or more legs to be moved to different angles in relation to the storage component 104.

Moreover, in some examples, each of the one or more legs of the telescoping locking leg stand has a foot that is flat and allows each of the one or more legs to stand on a flat surface securely. Each foot can be attached to a last telescoping section of the telescoping locking leg stand with a ball and socket type mechanism to allow the foot mobility to assist in obtaining the desire electronic device stance.

In the stored position, each of the one or more legs fits securely in the storage component 104, with a bottom side of each foot fitting flush against an interior of the storage component 104. A positioning of each of the one or more legs in the storage component 104 can vary to allow various positions for the electronic device to be locked in. A length of each of the one or more legs can also be manufactured to different lengths allowing the electronic device to be locked in various positions.

In the in-use position, each of the one or more legs is extended from the storage component 104 after a locking clip or holding mechanism is engaged and released. When each of the one or more legs reaches its desired length determined by the user, each of the one or more legs can be locked. It should be appreciated that each of the one or more legs may be locked at different lengths, creating the desired angle the user wants to the electronic device to stand at. In some examples, each of the one or more legs may also be spring loaded in the storage component 104, allowing them to be pushed out of the storage component 104 by the outward pressure of the spring for the ease of extending each of the one or more legs.

In some examples, a leg locking system may be used. This leg locking system may be manufactured inside each section of the telescoping locking leg stand other than a location where the feet are attached. A vertical depressed channel can be manufactured in each telescope section of each telescoping locking leg stand from the top to bottom of section. A horizontal depressed channel can be manufactured across a middle forming a channel cross. The horizontal depressed channel can be manufactured at a bottom of the second to last telescoping leg stand section to allow for the full extension of the telescoping locking leg stand to be locked. The horizontal channel can be manufactured around the entire inner circumference of the telescoping locking leg stand section or partially amount of the circumference.

Inside or outside of each telescoping locking leg stand telescoping section, which has the feet attached, is a protrusion that fits within the manufactured vertical and horizontal depressed channels. The protrusion can be manufactured at a top of this telescoping locking leg stand telescoping section to allow for full extended locking of each telescoping locking leg stand.

To extend the telescoping locking leg stand from the storage component 104 to the desired position, the interior protrusion is aligned inside the vertical depressed channel of each telescoping locking leg stand telescoping section to allow the foot telescoping section to pass through each telescoping section of the telescoping locking leg stand to its desired position. When the telescoping locking leg stand is at the desired position, the telescoping locking leg stand is locked by aligning the protrusion with the horizontal channel of the previous leg stand telescoping section, causing the telescoping locking leg stand to be locked at the desired position. This action can be repeated for each of the one or more legs, allowing the electronic device to be positioned as desired and be manipulated without the telescoping locking leg stand collapsing. If the telescoping locking leg stand is fully extended, the protrusion will be aligned with the horizontal channel of the adjacent telescoping section.

The telescoping locking leg stand may be placed in the stored position in the storage component 104 by a slide stop mechanism or a clip stop mechanism. Regarding the slide stop mechanism, on an exterior of each foot telescoping section of the telescoping locking leg stand is a depressed channel manufactured into the section which transverses the entire circumference of the section near the feet.

When the telescoping locking leg stand is pushed into the storage component 104, an internal case slide is pushed from an exterior of the storage component, which feeds/slides a flat mechanism inside the storage component 104 near an exterior wall of the storage component 104 opposite the electronic device case 102. The flat mechanism can be manufactured to have open half circles, which, when actioned slide into the depressed outside channel of each foot section locking them in place with the feet flush against the outer surface of the storage component 104. The opposite action can be executed to release the locking slide and allow the telescoping locking leg stand to be removed from the storage component 104.

Regarding the clip stop mechanism, inside each opening in the storage component 104 which the feet of each telescoping locking leg stand are fully stored is at least one clip. The at least one clip may potentially form a 90 degree angle or an approximately 90 degree angle, which fits over the bottom of each foot when stored. To place the telescoping locking leg stand in the in-use position, the clip stop is operated to release the at least one clip from holding the feet, which allows the telescoping locking leg stand to be extended out of the storage component 104.

Example 4

In a fourth example, the attachment includes the finger support component (of FIG. 8A, FIG. 8B, FIG. 8C, and FIG. 8D). The finger support component (e.g., the attachment 106) comprises at least one extendable wing 118, having at least one opening 122 to receive a finger of the user. It should be appreciated that a quantity of the at least one extendable wing 118 is non-limiting.

The finger support component allows the electronic device to be held in one hand by sliding one or two fingers of one hand in the at least one opening 122 created between the at least one extendable wing 118 and the electronic device case 102. This configuration allows the user to easily hold the electronic device in one hand and interact with the electronic device with the other hand. This configuration additionally also allows the electronic device to be extended from the user's body for viewing and other actions while keeping the electronic device secured in the one hand. When the user does not want to utilize this attachment 106, the user can simply slide the at least one extendable wing 118 back into the storage component 104 and utilize the electronic device in the manner he/she chooses. It should further be appreciated that the use of the one or more extendable wings allows the user to hold the electronic device securely with two hands and manipulate the electronic device with his/her thumbs or remaining fingers, such as utilizing the electronic device for gaming in horizontal or vertical positions.

In some examples, manual activation of the at least one extendable wing 118 may occur. In some examples, the at least one extendable wing 118 may be slightly smaller to allow them to be slid away from the storage component 104 to the in-use position. The at least one extendable wing 118 can be manufactured to slide within an interior track system. This system can be a depressed channel manufactured inside each long length of the storage component 104. The depressed channel can be manufactured at different elevations within the depth of the storage component 104, allowing the at least one extendable wing 118 to create different sized spaces between the at least one extendable wing 118 and the electronic device case 102. This allows for different size fingers to be slid in the space.

In additional examples, the at least one extendable wing 118 may be manufactured to be almost a full length of the storage component 104. In this configuration, the at least one extendable wing 118 can be stored at different elevations within the storage component 104 in the stored position utilizing multiple interior track systems for the at least one extendable wing 118 to be stored and extended from the storage component 104.

Numerous examples of the locking mechanism may be described herein. In an example, each of the at least one extendable wing 118 can be manufactured with a stop and lock system to allow each of the at least one extendable wing 118 to be locked in the stored position and at least in the in-use position which can be fully extended or less. A potential locking mechanism can include each of the at least one extendable wing 118 having at least two pairs of lock notches manufactured in each of the at least one extendable wing 118. The at least two pairs of the lock notches can be cut outs of a tongue of each of the at least one extendable wing 118 having the open end of the channel at the exterior edge and the closed end closer the middle of the tongue. A distance of the channel from the exterior edge to the middle of the tongue can be approximately ¼ of a width of each of the at least one extendable wing 118 or other distances based on the locking mechanism utilized.

At least one of the pair of the at least two pairs of lock notches can be located at the tip of the tongue (e.g., an end most distant from the storage component 104 when each of the at least one slidable wing is extended out of the storage component 104) and the other pair of the at least two pairs of lock notches can be located at the base of the tongue (e.g., an end least distant and potential remains inside the storage component 104). The utilization of tip slide wing locking notch can be to lock each of the at least one extendable wing 118 in the stored position and the utilization of the base locking notch can be to lock each of the at least one extendable wing 118 to its fullest extended position. Each of the at least one extendable wing 118 can have more than two pairs of locking notches to create the ability to have each of the at least one extendable wing 118 locked in different extended positions.

An example of a system to lock each of the at least one extendable wing 118 in place utilizing the locking notch may include locking pegs. The locking pegs may engage the locking notch to lock each of the at least one extendable wing 118. At least two locking pegs can be utilized and could be opposite each other. The at least two locking pegs can be positioned at the end of the storage component 104 from which the extendable wing exits the storage component 104 in the corners, allowing each of the at least one extendable wing 118 to exit the storage component 104. If the at least two locking pegs are positioned here, they can be utilized to lock each of the at least one extendable wing 118 in storage and in the in-use position.

The at least two locking pegs can be pushed up and down within the storage component 104 to enter the locking notch and lock each of the at least one extendable wing 118. The at least two locking pegs can be manufactured with a flange protruding off each locking peg opposite the storage component 104, creating an upside down "1" shape when viewed from the side of the storage component 104. The flange allows the user to pull up and push down each of the at least two locking pegs with a finger or object. Moreover, the flange can be manufactured with a block having a width and depth that at the least fits inside of the locking notch.

The block is the structure which locks each of the at least one extendable wing 118 in place since each of the at least one extendable wing 118 cannot move along the interior slide wing track system. The block can be manufactured on the interior side of the locking peg closest to the tongue and at different elevations on the locking peg. The different elevations of the locking peg will correspond to the elevation of each of the at least one extendable wing 118 inside the storage component 104 to engage the locking notch. When the locking peg is pushed down into the storage component 104 for locking, the locking peg top will be flush with the top (e.g., the side opposite the electronic device case 102). Moreover, the locking pegs can have their upward and downward motion contained within a channel, which is the same shape of the locking peg but slightly larger to allow the motion. This locking peg channel will stabilize the locking peg and assure the block stays securely in the locking notch.

Exterior edges of the storage component 104, from which each of the at least one extendable wing 118 extend, can be manufactured to cover the locking peg channels on each side. The exterior edge can be manufactured to only have an opening to allow for each of the at least one extendable wing 118 to extend and retract in the storage component 104.

Another locking mechanism for each of the at least one extendable wing 118 can be a clip locking system manufactured at the end of each of the at least one extendable wing 118, which, when each of the at least one extendable wing 118 is stored in the storage component 104 and wraps around the corners of the storage component 104 to clip in and out of the storage component 104. This configuration allows each of the at least one extendable wing 118 to be locked in the storage position in the storage component 104. To allow each of the at least one extendable wing 118 to be extended at different lengths, a spring-loaded type stop system can be manufactured into the long sides of storage component 104. This spring-loaded type stop system will allow the locking pegs to engage the locking notches of each of the at least one extendable wing 118 to hold them in place. Moreover, the spring-loaded type stop system may utilize a lever, pegs or any other mechanism to engage the locking notches. Furthermore, the spring-loaded type stop system may be actioned manually or automatically when each of the at least one extendable wing 118 is slid along the interior track system.

Example 5

In a fifth example, the attachment 106 includes the at least one finger grip opening. The at least one finger grip opening is configured to receive at least one finger on a hand of the user while a portion of the hand of the user engages the electronic device case 102 to hold the electronic device in a vertical position or in a horizontal position.

It should be appreciated that the attachment 106 may be manually activated. In an example, a push button mechanism may be engaged to push the at least one finger grip openings out of the storage component 104 to allow the user to grab and pull the at least one finger grip openings into the in-use position. In some examples, the shape of each of the at least one finger grip opening includes a rectangular shape with square, rounded, or other shaped edges.

In an illustrative example, each half of the at least one finger grip opening is rectangular and forms a "U" shape which meet at the open end of the "U" shape. The at least one finger grip opening can be manufactured to be foldable onto itself. One method of folding it onto itself is by manufacturing pivot points/creases in the solid rectangular area. The pivot/creases can be manufactured along any point(s) of the at least one finger grip opening. In this embodiment, the pivot/creases can be manufactured to a ¼ of the length of the overall at least one finger grip opening, starting from the unopened/closed of the "U" shape. This configuration allows the ¼ length of the unopened/bottom of the "U" shape to folded back toward and on top of the open end of the "U" shape. Accordingly, when both unopened/closed portions of the "U" shape are folded, the overall length of the at least one finger grip opening is half of its original size and will fit inside the storage component 104.

In another example, the at least one finger grip opening may be expanded and/or retracted via the telescoping mechanism. The unopened/closed portion of each "U" shape can be pushed into and toward the open end of the "U" shape, creating a smaller area of the at least one finger grip opening that can fit into the storage component. In some examples, each of the at least one finger grip opening may be manufactured with a stop and lock system, locking pegs, or a clip locking system, as explained previously in other examples.

Example 6

In a sixth example, the attachment 106 includes a light or privacy shield (of FIG. 6A, FIG. 6B, FIG. 6C, FIG. 6D, FIG. 6E, and FIG. 6F). This attachment 106 allows the user to view and interact with the electronic device in direct or in-direct light by blocking the light from illuminating the screen of the electronic device. This attachment also enhances the ability of the user to block the ability of others to view the contents of the screen of the electronic device enhancing the privacy of the user. It should be appreciated that the light or privacy shield may be a base shield, a flip shield, a canopy, or a hood. In examples, the light or privacy shield includes one or more flaps to assist in protecting a privacy of a screen of the electronic device and/or to prevent light from washing out the screen of the electronic device.

In a first example, the attachment may comprise a base shield component. In the stored position, the base shield component will be stored in the storage component 104 within an interior track system. This system can be a depressed channel manufactured inside each long length of the storage component 104, as explained previously. A portion of the base shield component may extend past the electronic device case 102.

In some examples, the attachment may also comprise a flip shield component in addition to the base shield component. The flip shield component may be affixed to the base shield component by a mechanism that allows the flip shield component to be folded onto the base shield component. The flip shield component can be manufactured to be folded onto either side of the base shield component. In this example, the flip shield component is folded onto the bottom side of the base shield component. The bottom side of the base shield component faces away from the electronic device case 102 (which contains the electronic device) when extended out of the storage component 104.

When the user wants to place the attachment 106 into the use position he/she will push the base shield component out of the storage component 104 to its fullest extension. The user may then move the flip shield component from its stored position against the base shield component approximately 270 degrees away from the electronic device case 102 to form a 90-degree angle or an approximately 90-degree angle facing the electronic device case 102.

In another example, the base shield component can be replaced by at least one shield support leg. In an example, the at least one shield support leg may comprise two shield support legs. The at least one shield support leg can be manufactured to slide along the interior track system and be stored within the storage component 104 in the stored position. Further, the at least one shield support leg can be attached to the flip shield component at the end of the at least one shield support leg, which protrude the farthest away from the storage component 104 in the in-use position.

In an additional example, the attachment 106 may further include a canopy component affixed to the flip shield component. The canopy component can be manufactured to be folded onto either side of the flip shield component. In this example, the canopy component is folded onto the outside of the flip shield component when it is in its in-use position. This is the side of the flip shield component which faces away from the electronic device case 102.

When the user wants to place the attachment into the use position, he/she will push the base shield component out of the storage component 104 to its fullest extension. The user may then move the flip shield component from its stored position against the base shield component approximately 270 degrees away from the electronic device case 102 to form a 90-degree angle or an approximately 90-degree angle facing the electronic device case 102.

In examples, the canopy component can be manufactured with flaps creating a hood component. One of more flaps can be attached to the edges of the canopy component not utilized to attach to the flip shield component. The one or more flaps may be folded onto either side of the canopy component. When the user wants to utilize the hood component, he/she unfolds the flaps from their stored position against the canopy component and moves them to a desired angle in relation to the canopy component to achieve the desired direct or in-direct light blockage and/or the level of privacy interacting with their electronic device.

It should be appreciated that hinges may be used to connect any of these referenced components of Example 6. For example, the hinges may include an incremental-angle hinge, which may be locked at various angles and released by a push button component. In examples where the incremental-angle hinges are utilized, locking pegs/channels would not be required.

In another example, a pin hinge may be used. The pin hinge may transverse an entire width of the component which is adjacent to the other component interwoven between the two creating a union of the two allowing the movement. The pin hinge can be secured in this configuration by encasing it within width of the components. If pin hinges are utilized, then locking pegs and locking channels can be utilized to lock the components in the desired position. This configuration is similar to a door hinge. For example and as depicted in FIG. 6A—FIG. 6F, the flaps of the hood component can utilize pin hinges to connect and move in relation to the hood component.

In another configuration, the storage component 104 may extend past the electronic device case, such that the storage component 104 may be configured in the shape of an "L" In this example, the storage component 104 may be affixed to the electronic device case 102 with a longer portion of the "L" configuration being attached to the bottom of the electronic device case 102 and with the shorter portion of the "L" configuration adjacent to a top portion of the electronic device.

In an additional embodiment, a flexible corrugated shield/privacy screen may be stored inside of the storage component 104. The shield/privacy screen can be manufactured in a solid form to block the direct/in-direct sunlight and provide privacy for the user when interacting with the electronic device (see, FIG. 6A-FIG. 6F). For example, the shield/privacy screen can be stored in the storage component 104 on an interior track system and can utilize the locking mechanisms described in other attachments.

In a further embodiment, the storage component 104 may be manufactured as the same size of the entire size of the electronic device case. In other embodiments, the storage component 104 may be manufactured with the one or more legs of Example 3.

Example 7

Figure 7A:
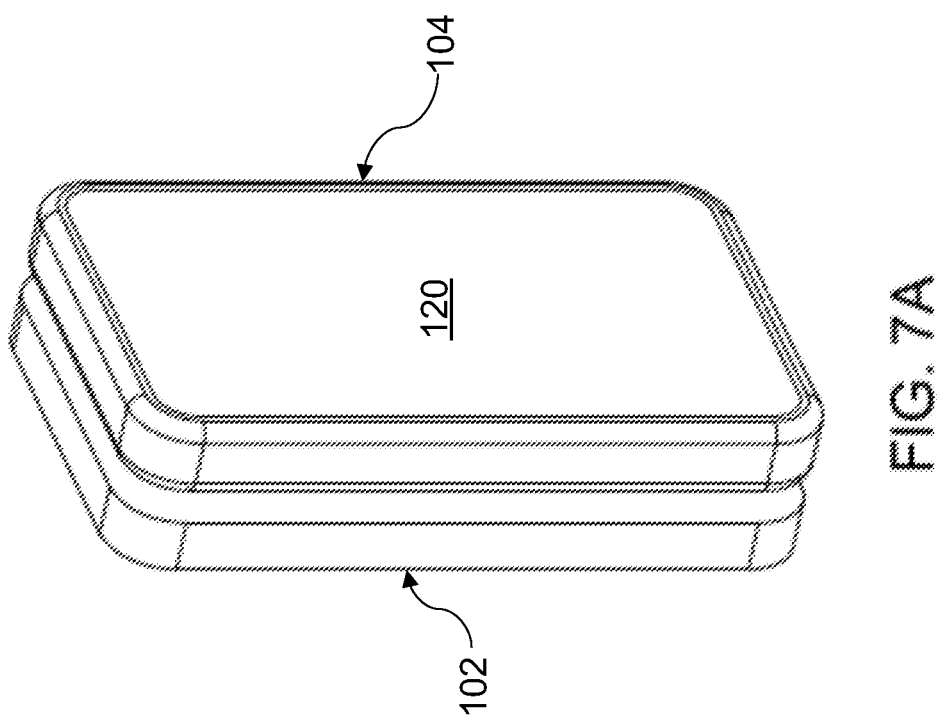
Figure 8A:
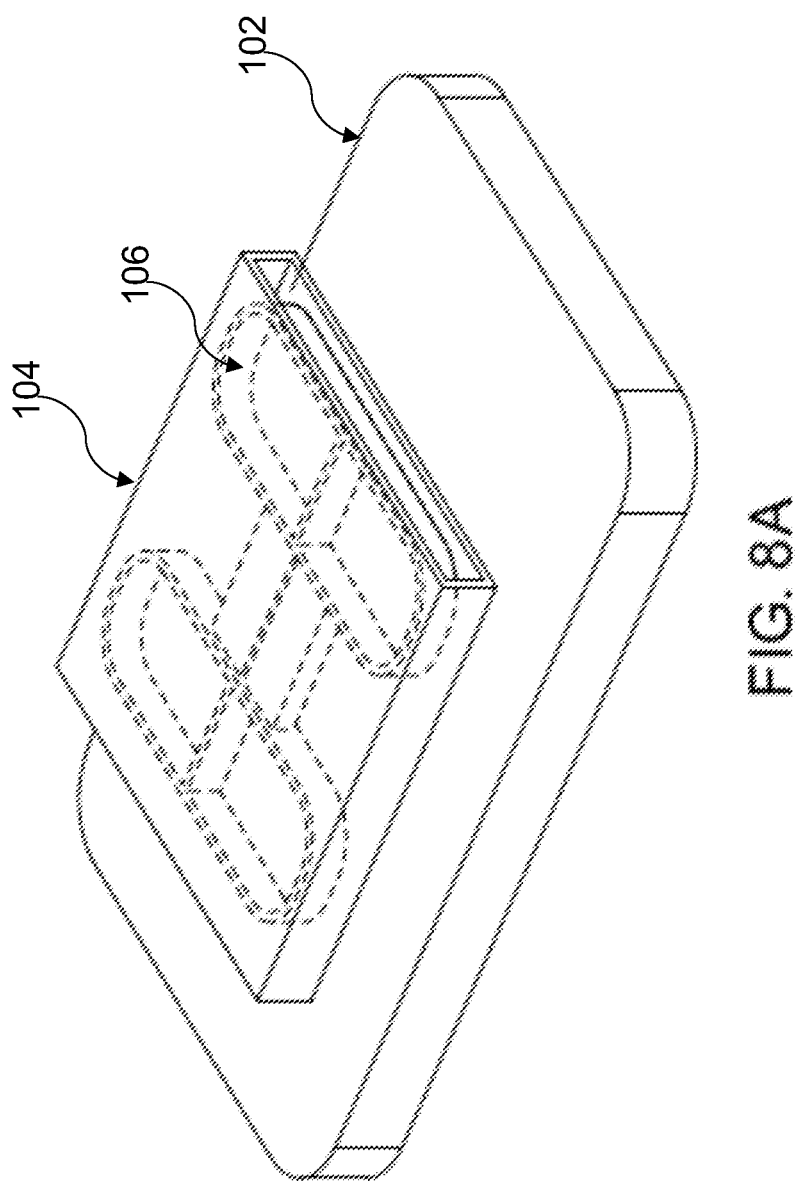
FIG. 8A depicts a schematic diagram of an attachment comprising a finger holder component of an electronic device attachment system, the attachment being stored in a non-use position in a storage component of the electronic device attachment system, according to at least some embodiments described herein.
Figure 8B:
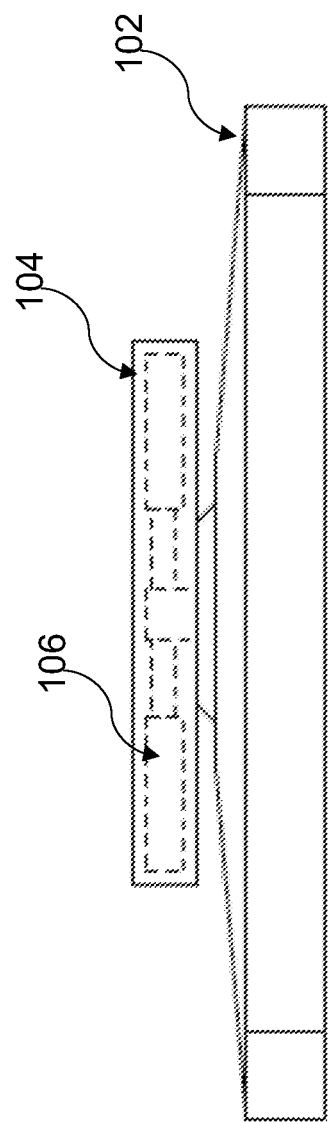
Figure 8C:
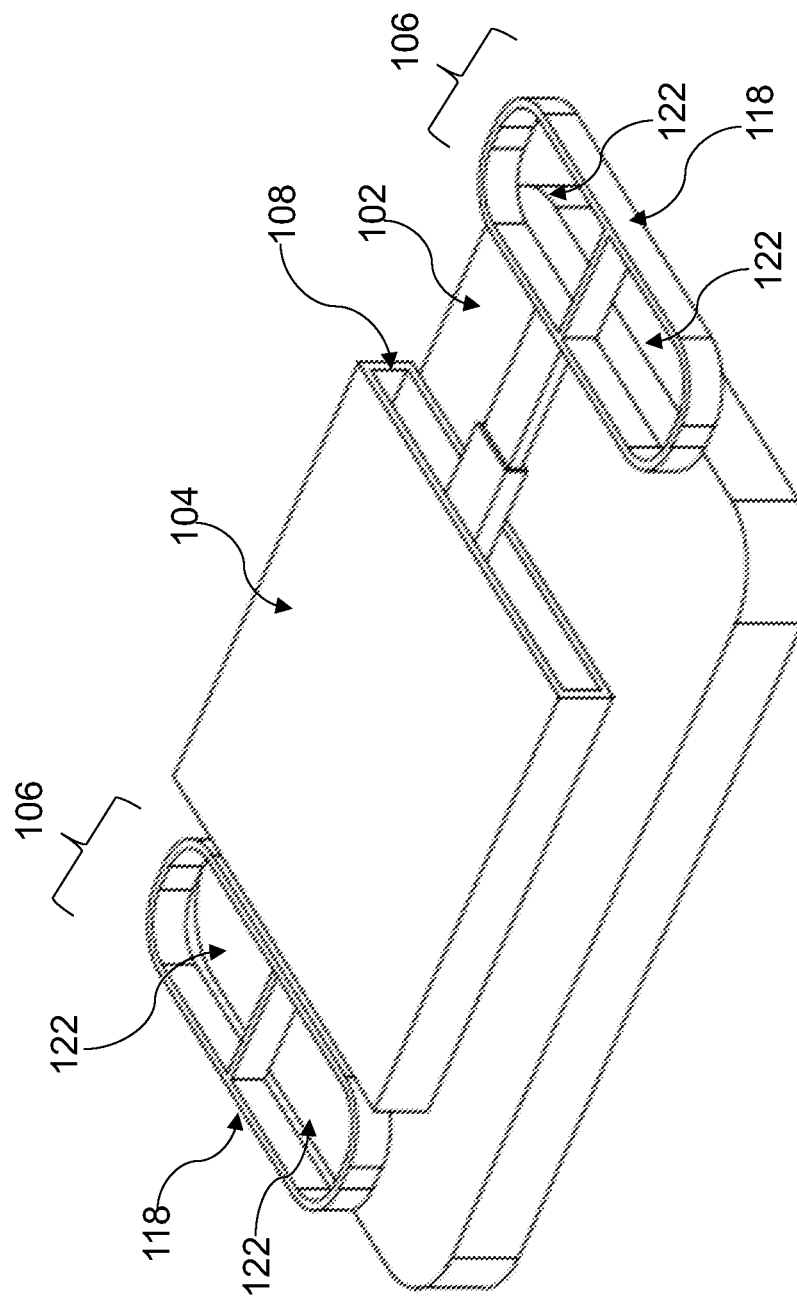

In a seventh example and as depicted in FIG. 7A and FIG. 7B, the storage component 104 comprises a cover 120. In examples, the cover 120 includes one or more transparent sections. The storage component 104 may be configured to receive and house one or more objects, such as a photograph, signage, ear buds, a credit card, a debit card, a business card, a driver's license, cash, coins, and/or medicine, among other examples. It should be appreciated that the one or more objects may be viewable by the user through the one or more transparent sections of the cover 120.

In some examples, the storage component 104 may comprise a closure mechanism 150 (of FIG. 7B) to ensure the one or more objects housed within the storage component 104 remain within the storage component 104. In examples, the closure mechanism 150 may include a hinge type mechanism, a lid component, an electronically operated mechanism, among others.

In additional configurations, one or more protruding ledges may be located inside of the cover 120 at each corner to hold a photograph, which may be viewable through the one or more transparent sections of the cover 120 when the storage component 104 is closed. In a further example, the cover 120 may also be configured to hold a challenge coin in a manner or means similar to the photograph. However, the challenge coin may be held inside of the cover 120, with the cover 120 having the one or more transparent sections to allow an individual to view the challenge coin when the storage component 104 is closed. It should be appreciated that a "challenge coin" is a designated coin representing a military or law enforcement unit. This example allows the user to display his/her units challenge coin in the storage component 104.

In other examples, the cover 120 of the storage component 104 fails to include the one or more transparent sections, such that an individual cannot view any objects housed within the storage component 104.

Example 8

In an eighth example, the attachment 106 comprises a belt or a stationary clip. This attachment allows the user to attach the electronic device case 102 to his/her belt or another item to hold the electronic device. In some examples, the belt or the stationary clip may comprise a rotation mechanism, allowing the electronic device to be rotated while affixed to the users' belt or other item.

Example 9

In a ninth example, the attachment 106 comprises one or more adjustable grips. The one or more adjustable grips allow the user to affix the electronic device case 102 to anything the one or more grips can be secured upon. In some examples, this attachment 106 comprises the at least one telescoping leg (explained supra), allowing the electronic device to be viewable from numerous angles. The at least one telescoping leg can telescope with a largest telescoping section being secured within the storage component 104. In other examples, the at least one telescoping leg can telescope with the smallest telescoping section being secured within the storage component 104.

It should be appreciated that in some examples, the at least one telescoping leg comprises an adjustable grip at an end (e.g., at a portion opposite an end affixed within the storage component 104). The adjustable grip may comprise a locking grip manufactured with two or more angled hooks and the foot of each hook can be offset from each other in any direction. The foot of each hook can be manufactured flat foot of material or the ends of the locking grip can be manufactured with round balls of material.

In the stored position, the at least one telescoping leg fits securely in the storage component 104 with the flat foot of each locking grip fitting flush against the outside of the storage component, which is opposite the side of the electronic device case 102 (e.g., the exposed side). The storage component 104 can be manufactured with the at least one telescoping leg in different positions.

To move this attachment 106 from the stored position to the in-use position, each of the at least one telescoping leg is/are extended from the storage component 104 after a locking clip or holding mechanism is engaged and released. When each of the at least one telescoping leg reaches its desired length determined by the user, each of the at least one telescoping leg can be locked. In some examples, each of the at least one telescoping leg can be spring loaded in the storage component 104, allowing them to be pushed out of the storage component 104 by the outward pressure of the spring for the ease of extending each of the at least one telescoping leg. A locking system may be manufactured inside each section of the at least one telescoping leg, as explained in other examples. Placing the attachment 106 in the stored position in the storage component 104 may occur via: a slide stop mechanism or a clip stop mechanism, as explained previously.

Example 10

In a tenth example, the attachment 106 comprises one or more finger and/or strap holders/straps. The one or more finger and/or strap holders/straps allow the user to hold the electronic device with one or more fingers of at least one hand. When the finger(s) of at least one hand are slipped through the one or more finger and/or strap holders/straps, the palm of the hand (e.g., the bottom hand if two hands are utilized) can rest against the closed storage component 104. This attachment 106 allows the user to hold the electronic device in various positions for viewing, interacting, talking, listening and other activities in a secure manner.

It should be appreciated that the one or more finger and/or strap holders/straps may comprise a nylon or a plastic material, among other materials that are flexible and resilient enough to be secured to the storage component 104 and not break from the force of the user's finger(s) or hand(s) pushing against it. In other examples, the one or more finger and/or strap holders/straps may comprise padding, non-abrasive, or another material in the area where the top of the user's fingers and/or the top of the user's hand will make contact for comfort and not to cause irritation. The size of the one or more finger and/or strap holders/straps may be adjustable to accommodate differing sizes of users' fingers and hands.

In an illustrative example, a first end of the one or more finger and/or strap holders/straps may be permanently secured to a base of an interior of the storage component 104. The securement may occur via screws, rivets or other fastening devices. This first end of the one or more finger and/or strap holders/straps can be manufactured in the shape of a "T," in which the fastening devices are secured through the top of the "T" or with no "T" and the fastening devices are secured through the one or more finger and/or strap holders/straps. An adjustable end of the one or more finger and/or strap holders/straps can be manufactured with teeth that are perpendicular to the one or more finger and/or strap holders/straps. Moreover, the closed door of the storage component 104 may be utilized to lock the finger/holder straps and to adjust them.

Example 11

In an eleventh example, the attachment 106 comprises a speaking privacy shield, similar to Example 6. This attachment 106 may be used when the user want to have a private conversation via their electronic device and does not want others to overhear them. In a first example, the storage component 104 does not extend past the end of the electronic device case 102. In a second example, the storage component 104 extends past the end of the electronic device case 102.

The speaking privacy shield differs from Example 6, in that, the base component and the flip shield of this Example 11 extend and exit the storage component 104 from a side of the storage component 104 in relation to the electronic device, rather than from a top of the storage component 104 in relation to the electronic device. Additionally, the storage component 104 may be attached to the electronic device case 102 in one direction, with the speaking privacy shield covering a right side of the electronic device in relation to facing a front face of the electronic device with the user holding the electronic device in his/her left hand. The storage component 104 can then be removed, turned 180-degrees, and re-attached to the electronic device case, placing the speaking privacy shield on an opposite side, allowing the user to hold the electronic device in his/her right hand.

Example 12

In a twelfth example, the attachment 106 comprises one or more suction cups. It should be appreciated that a quantity of the one or more suction cups is non-limiting. The one or more suction cups allow the user to secure the electronic device to a surface compatible to utilization of a suction cup to view and interact with the electronic device without holding it. As an example, the user can secure his/her electronic device to a mirror.

In a first example, the one or more suction cups may comprise one suction cup. The suction cup may vary in size and shape. The suction cup can be manufactured with an opening in its bottom center to allow for a stem to fit through it. The opening can be manufactured with various diameters and the diameter of the stem will be in relation to the size of the opening in order for the suction cup to transverse up and down the stem.

The stem may be manufactured with one end attached inside the storage component 104. A length of the stem can vary, but can be manufactured to fit within the storage component 104 from the bottom of the storage component 104, which is adjacent to the electronic device case 102, to the storage component 104 cases doors. The other end of the stem, which is not attached in the storage component 104, can be manufactured with a flat or concave disk (disk). The suction cup can be manufactured to rest below the disk. In the in-use position, the disk stops the suction cup from being detached from the stem. The disk also seals the opening in the bottom of the suction cup blocking air from entering the suction cup when in use.

In examples, the stem can be manufactured to be a length which extends past the storage component 104 doors. The length of the stem is in relation to the thickness of the suction cup at its bottom and location of the locking groove below the disk. The locking groove can be a depressed groove which transverses the stem. The locking groove allows the storage component 104 doors to close upon it to securely hold the stem in position.

The outer bottom of the suction cup opposite the inner bottom secured by the disk can be manufactured to sit just above the locking groove on the stem. Accordingly, in the in-use position the suction cup is outside of the storage component 104 against the disk and the doors of the storage component 104 are closed against the locking groove securing the suction cup for use.

The storage case 104 be manufactured with one or more doors, as explained supra, to allow the suction cup to be removed from the storage component 104. In the stored or non-use position, the suction cup rests at the bottom of the stem enclosed in the storage component 104 with the doors closed against the locking groove. The disk can be manufactured to extend passed the closed doors with the flat surface of the disk exposed slightly. In the in-use position, the doors of the storage component 104 are slide outward. The suction cup is slid up the stem to engage the disk. The doors are then closed on the stem against the locking groove. The user can hold their electronic device and push the suction cup against a compatible surface to secure it for use.

Example 13

In a thirteenth example, the attachment 106 comprises one or more lanyards 126 of FIG. 9A and FIG. 9B. It should be appreciated that a quantity of the one or more lanyards 126 is non-limiting. The one or more lanyards 126 may allow the user to secure his/her electronic device to a belt or another item. This attachment 106 can be utilized whenever the user is active and they are concerned their electronic device could be dislodged from their person. Some activities in which this could occur include the following, but are not limited to: running, walking, riding a bike, riding a motorcycle, and others. The attachment 106 can also be utilized as a fashion statement with the user choosing the type, design, color and size of the lanyard 126. It should further be appreciated that each of the one or more lanyards 126 may be manufactured or created from any material, such as a chain material, a rope material, and/or a leather material, among others not explicitly listed herein.

The storage component 104 may be manufactured with two compartments. A first component of the two compartments can be manufactured with an opening at the bottom of the storage component 104, which is adjacent to the electronic device case. The first compartment will receive and lock a lanyard securing clip to which the lanyard 126 is attached. The first compartment can occupy the entire length of the storage component 104 or have empty space in front of the securing clip to assist in storing the lanyard 126 when in the stored position.

A second compartment of the two compartments may sit above the first compartment and may also occupy the space not utilized by the first compartment to secure the securing clip in the storage component 104. Accordingly, the storage component 104 will essentially have two levels within it. The second compartment can be open to allow the storage of the lanyard 126 and securing clip within the stored position. If the first compartment extends passed the securing clip, the whole or part of the lanyard 126 and securing clip can also be place in it.

A wall can be manufactured between the first compartment which contains the receiver for the securing clip and the open space utilized to assist in storing the lanyard 126 and securing clip. The wall can assist in not tangling the lanyard 126 and/or securing clip in the receiver. The storage component 104 can be manufactured with a sliding cover to close the open second compartment. Accordingly, in the stored position, the lanyard 126 and securing clip are placed in the second compartment and the sliding cover can be secured over the opening to keep the contents inside. The sliding door can be manufactured to slide along depressed grooves on the top inside of the storage component 104. The sliding door can be secured close with locking pegs as described supra. In another example, the storage component 104 can be closed as described previously, utilizing two doors.

The one or more lanyards can be secured to the securing clip with various methods. For example, the securing clip can be manufactured to receive the lanyard 126 inside itself before the flexible points with hooks begin. This open shaft of the securing clip can be manufactured of various lengths and secure the lanyard 126 with various methods. For example, the open shaft can be manufactured with crimps which provide downward pressure on the lanyard 126 within the open shaft or the lanyard 126 can be glued in place inside the open shaft. The loop or opening 152 (of FIG. 9B) of the lanyard 126 can be manufactured to secure on a belt or other item with various methods. For example, the loop or opening 152 can utilize Velcro to secure against itself.

To place the attachment 106 from the stored position as described above to the in-use position, the user opens the storage component 104 and removes the lanyard 126 and securing clip. The user can choose to push the securing clip into the first compartment or secure the loop or opening 152 to his/her belt or other item of choice. When the securing clip is secured in the first compartment and the loop or opening 152 is secured the user can place the electronic device in/on a desired area or hold the electronic device. If for any reason the electronic device is dislodged from its place, the lanyard 126 will keep the electronic device attached to the user for it to be recovered.

Example 14

In a fourteenth example, the attachment 106 allows the user to affix signage and/or personalize or decorate their electronic device. The signage can be in the form of sayings, statements, photos, advertising, and other visual affects which can be viewed when the attachment is in the in-use position. Personalizing the electronic device can be in the form of text or photos. Further, the user may wish to decorate the electronic device for religious holidays and/or birthdays, or may wish to add designs, patterns, and/or color schemes to enhance the use of the electronic device. The attachment 106 can also be utilized to make the electronic device resemble an animal or person.

In some examples, the attachment 106 may be manufactured with telescoping arm(s), as explained supra. In examples, the storage component 104 may have multiple telescoping arms that extend and retract from the storage component 104. In a first example, a quantity of the telescoping arms is seven. The telescoping arms may be stored in the storage component 104. Two of the telescoping arms may represent feet, two of the telescoping arms may represent arms, two of the telescoping arms may represent ears, and one of the telescoping arms may represent a face. These seven telescoping arms may allow the electronic device to resemble a person or an animal.

Example 15

In a fifteenth example, the storage component 104 itself is an "S"-shaped clip 128 (as depicted in FIG. 10). As explained in other examples, the "S"-shaped clip 128 may have an in-use and a non-use or a stored position. The "S"-shaped clip 128 may be affixed to the electronic device case and comprises a flat surface. In some examples, the "S"-shaped clip 128 has a slight curve at an end to allow the "S"-shaped clip 128 to rest on an outside of a user's pant pockets, with the electronic device being secured inside of the user's pant pockets. It should be appreciated that the "S"-shaped clip 128 may comprise another shape besides an "S"-shape, such as a halve-shape or a u-shape, or any other shape not explicitly listed herein, that is capable of performing the functions of Example 15 (e.g., can rest on an outside of a user's pant pockets, with the electronic device being secured inside of the user's pant pockets). In a first example, the "S"-shaped clip 128 may be a detachable secure clip, as explained previously. In a second example, the "S"-shaped clip 128 may be a secure clip configured as one piece or component.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

When introducing elements of the present disclosure or the embodiments thereof, the articles "a," "an," and "the" are intended to mean that there are one or more of the elements. Similarly, the adjective "another," when used to introduce an element, is intended to mean one or more elements. The terms "including" and "having" are intended to be inclusive such that there may be additional elements other than the listed elements.

Although this invention has been described with a certain degree of particularity, it is to be understood that the present disclosure has been made only by way of illustration and that numerous changes in the details of construction and arrangement of parts may be resorted to without departing from the spirit and the scope of the invention.

What is claimed is:

1. An electronic device attachment system comprising:
   an electronic device case configured to receive and house an electronic device and comprising at least one receiver port comprising one or more concave recessions;
   a storage component affixed to the electronic device case, wherein the storage component is configured to receive and house at least two objects selected from the group consisting of: coins, a challenge coin, and medicine;
   a receiver component affixed to the storage component, wherein the receiver component comprises one or more notches extending from an outer surface such that the one or more notches are received by the one or more concave recessions of the at least one receiver port of the electronic device case to affix the storage component to the electronic device case; and
   one or more attachments.

2. The electronic device attachment system of claim 1, wherein the electronic device is selected from the group consisting of: a smartphone, a lap top computer, a mobile media player, a tablet, and any other handheld electronic device.

3. The electronic device attachment system of claim 1, wherein each of the one or more attachments comprise an in-use position and a non-use position, and wherein each of the one or more attachments are stored in the storage component when in the non-use position.

4. The electronic device attachment system of claim 3, wherein engagement of a mechanism modifies the non-use position of each of the one or more attachments to the in-use position of each of the one or more attachments.

5. The electronic device attachment system of claim 4, wherein the mechanism is selected from the group consisting of: a push button mechanism, a clip mechanism, a lever mechanism, a swinging door mechanism, and a sliding door mechanism.

6. The electronic device attachment system of claim 4, wherein the mechanism is detachable and interchangeable.

7. The electronic device attachment system of claim 4, wherein the mechanism is detachable for storage in the storage component.

8. The electronic device attachment system of claim 1, wherein the storage component is rotatable in relation to the electronic device case.

9. The electronic device attachment system of claim 1, wherein the storage component comprises:
   an opening for the one or more attachments to enter the storage component when in the non-use position and to exit the storage component when in the in-use position; and
   a flap component or a door component configured to seal the opening.

10. The electronic device attachment system of claim 1, wherein an attachment of the one or more attachments is selected from the group consisting of: a holder component, a holder component affixed to an expansion and retraction mechanism, one or more telescoping locking leg stands, an electronic device stand, a finger support component, a privacy component to block a screen of the electronic device, at least one finger grip opening, a clip component being configured to affix to a belt of a user, an adjustable grip, a finger holder, a hand strap, a speaking privacy shield, one or more suction cups, a lanyard, and a secure clip.

11. The electronic device attachment system of claim 1, wherein the storage component is configured to receive and house at least one other object selected from the group consisting of: a photograph, signage, ear buds, a credit card, a debit card, a business card, a driver's license, and cash.

\* \* \* \* \*